United States Patent
Kolawa et al.

(10) Patent No.: US 6,370,513 B1
(45) Date of Patent: Apr. 9, 2002

(54) METHOD AND APPARATUS FOR AUTOMATED SELECTION, ORGANIZATION, AND RECOMMENDATION OF ITEMS

(75) Inventors: Adam K. Kolawa, Bradbury; Arthur Ray Hicken, Upland; Stephen Frankini, Arcadia; Skirmantas Kligys, Pasadena; Emelina Gesheshyen, Glendale; Maxim Troukhan, South Pasadena, all of CA (US)

(73) Assignee: Parasoft Corporation, Monrovia, CA (US)

( * ) Notice: Subject to any disclaimer, the term of this patent is extended or adjusted under 35 U.S.C. 154(b) by 0 days.

(21) Appl. No.: 09/340,518

(22) Filed: Jun. 28, 1999

Related U.S. Application Data

(63) Continuation-in-part of application No. 09/131,146, filed on Aug. 7, 1998, now Pat. No. 6,236,974
(60) Provisional application No. 60/055,023, filed on Aug. 8, 1997.

(51) Int. Cl.[7] .............................................. G06F 17/60
(52) U.S. Cl. .............................. 705/10; 705/10; 705/15
(58) Field of Search ............................. 705/7, 10, 8, 15

(56) References Cited

U.S. PATENT DOCUMENTS

| | | | | |
|---|---|---|---|---|
| 4,807,169 A | * | 2/1989 | Overbeck | 364/715.01 |
| 4,996,642 A | * | 2/1991 | Hey | 364/419 |
| 5,233,520 A | * | 8/1993 | Kretsch et al. | 364/413.29 |
| 5,583,763 A | * | 12/1996 | Atcheson et al. | 364/551.01 |
| 5,749,081 A | * | 5/1998 | Whiteis | 707/102 |
| 5,832,446 A | * | 11/1998 | Neuhaus | 705/1 |
| 5,884,282 A | * | 3/1999 | Robinson | 705/27 |
| 5,960,440 A | * | 9/1999 | Brenner et al. | 707/104 |
| 5,963,948 A | * | 10/1999 | Shilcrat | 707/100 |
| 5,978,766 A | * | 11/1999 | Luciw | 705/1 |
| 5,979,757 A | * | 11/1999 | Tracy et al. | 235/383 |
| 5,999,975 A | * | 12/1999 | Kittaka et al. | 709/224 |
| 6,012,051 A | * | 1/2000 | Sammon et al. | 706/52 |
| 6,018,738 A | * | 1/2000 | Bresse et al. | 707/100 |
| 6,020,883 A | * | 2/2000 | Herz et al. | 345/327 |
| 6,046,021 A | * | 4/2000 | Bochner | 435/34 |

FOREIGN PATENT DOCUMENTS

| | | | | |
|---|---|---|---|---|
| JP | 08063455 | | 3/1996 | 15/20 |
| JP | 408064355 A | * | 3/1996 | |

OTHER PUBLICATIONS

Food Chemical News, Database Management is Key to Database Quality. Jul. 22, 1996, v38 n22.*
Bill Communications Inc. A Steady Stream of New Applications . . . Institutional Distribution v19. Nov. 1983.*

* cited by examiner

Primary Examiner—Tariq R. Hafiz
Assistant Examiner—James A. Reagan
(74) Attorney, Agent, or Firm—Christie, Parker & Hale, LLP

(57) ABSTRACT

An automated recommendation system keeps track of the needs and preferences of the user through a user preference vector. Each field of the user preference vector represents the user's preference for a specific item attribute. Item attributes are defined by a systems programmer. The systems programmer also creates product vectors of items in the recommendation database. A user preference vector is compared against a product vector to determine if the product is suitable for recommendation. A recommended item may be purchased by the user by submitting a purchase request over a network connection. The user preference vector is constantly refined through feedback from the user about the recommended items.

37 Claims, 32 Drawing Sheets

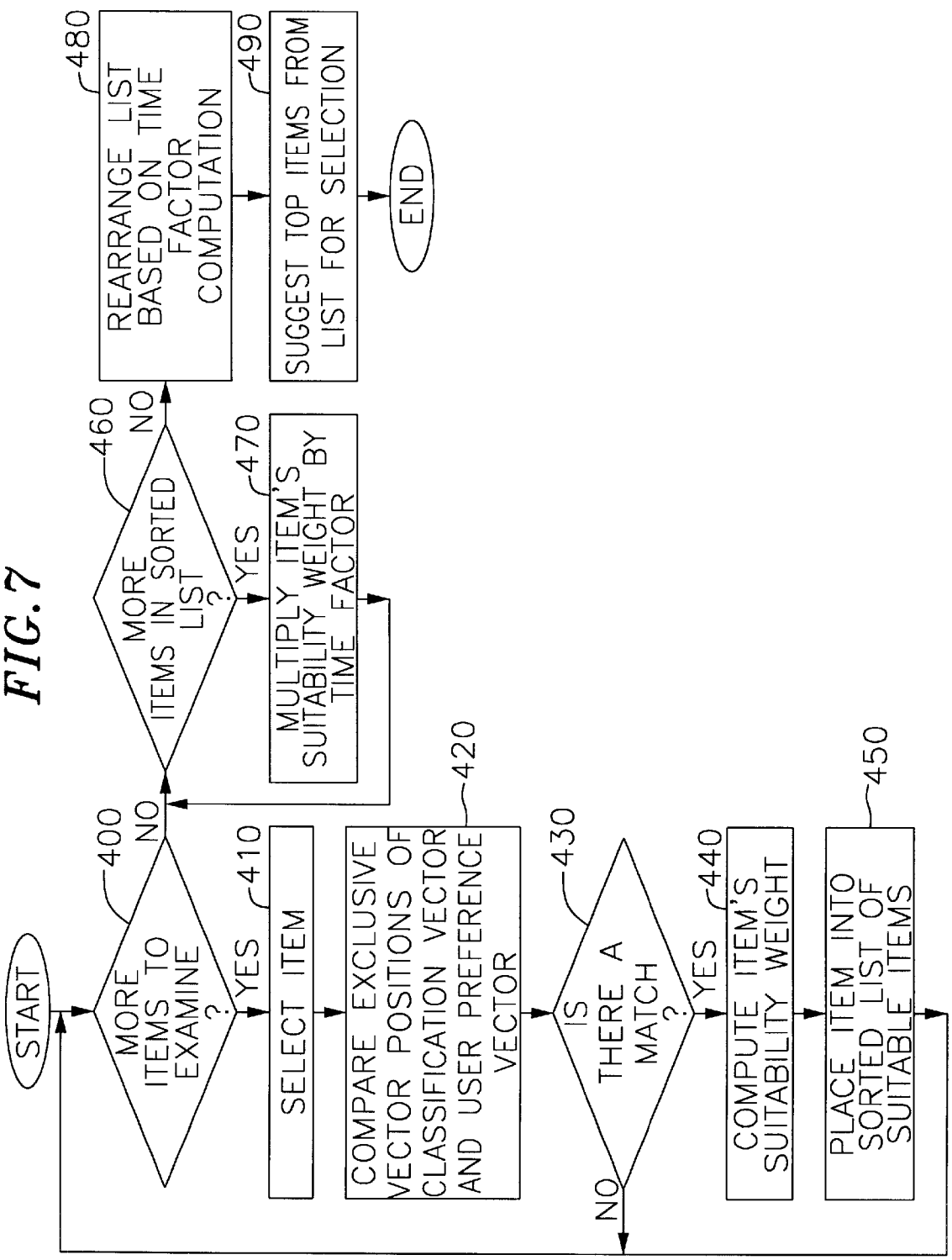

FIG. 13

FILE  SORT  SEARCH  HELP

PRODUCT: TIME — 715
- ADD
- DELETE
- MODIFY NAME
- DISABLE DISTANCE WINDOW

ENTER NEW PRODUCT NAME:
PRODUCT NAME

PRODUCT LIST:

SPEED
ROMANCE
POPULARITY
VIOLIN
PIANO
GUITAR

— 710

DISTANCES FROM PRODUCT:

NUMBER OF PRODUCTS: 0

EXCLUSIVE PREFERENCES
- ☐ COUNTRY   ☐ CLASSICAL          ☐ GOLDEN OLDIES
- ☐ RAP       ☐ DISCO              ☐ ROCK
- ☐ JAZZ      ☐ ADULT CONTEMPORARY ☐ OPERA
- ☐ FOLK MUSIC ☐ INTERNATIONAL MUSIC ☐ NEW AGE
              ☐ HEAVY METAL 730, 700, 720, 725, 705

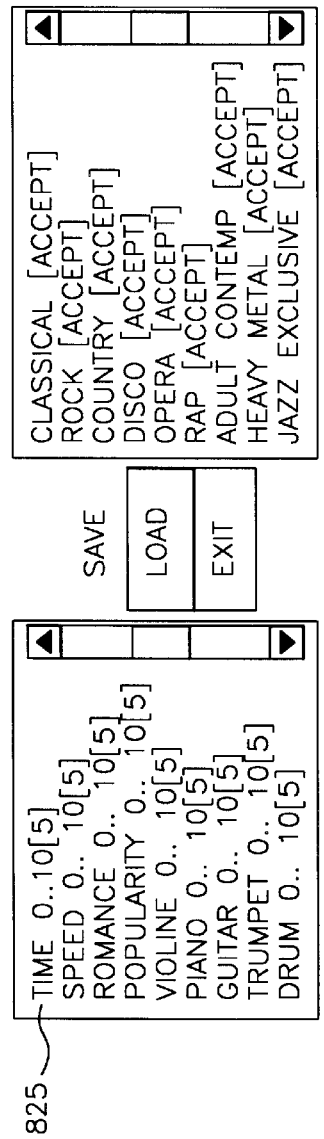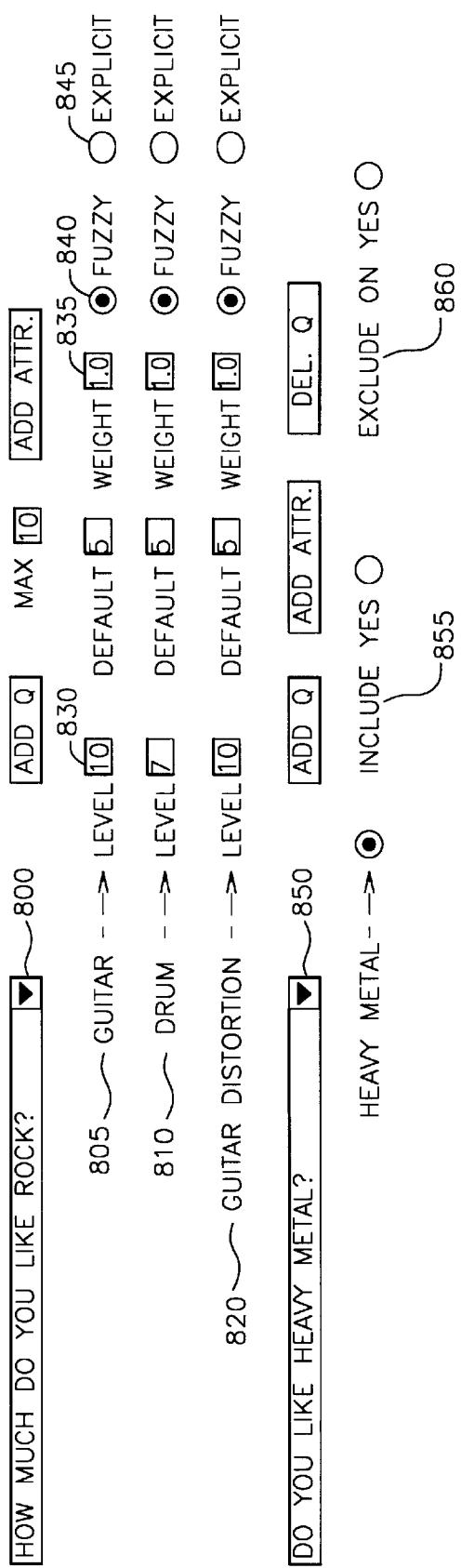
FIG. 14

FIG. 18

WELCOME TO FOOD MAGIC.

| | | |
|---:|:---|:---|
| ENTER YOUR EMAIL ADDRESS: | ☐ | * |
| ENTER A NEW USERNAME: | ☐ | * |
| ENTER YOUR PASSWORD: | ☐ | * |
| CONFRIM PASSWORD: | ☐ | * |
| FIRST NAME: | ☐ | * |
| LAST NAME: | ☐ | * |
| STREET ADDRESS: | ☐ | |
| CITY: | ☐ | |
| STATE: | ☐ | |
| ZIPCODE: | ☐ | * |
| TELEPHONE#: | ☐ | |
| FAX#: | ☐ | |

[SUBMIT]

FIG. 19

WELCOME TO FOOD MAGIC.

PLEASE ANSWER THE FOLLOWING TO GET US AQUAINTED WITH YOUR TASTE

PLEASE FIND YOUR FAVORITE DISH:

900 — DISH NAME: [_____] — 902  [FIND DISHES]

NOW PLEASE RATE THE FOLLOWING;

904 — WHICH DISH YOU LIKE MOST?  [FILET MIGNON WITH MUSHROOM-WINE SAUCE ▶] — 906

? [BROCCOLI CAULIFLOWER CASSEROLE ▶] — 906

? [LASAGNA ▶] — 906

? [BAKED SALMON PROVENCALE ▶] — 906

? [RICH APPLE PIE ▶] — 906

PLEASE SELECT A SPECIFIC DIET: — 908

☒ NO DIET  ☐ VEGETARIAN  ☐ VEGAN  ☐ DIABETICS

PLEASE MARK ANY OF THE FOLLOWING ALLERGIES: — 910

☒ NONE  ☐ PEANUTS  ☐ NUTS  ☐ MILK  ☐ EGGS  ☐ SOY  ☐ SHELLFISH  ☐ WHEAT  ☐ WHEAT-FREE  ☐ DAIRY-FREE  ☐ LOW-FAT

[FIND DISHES]

EAT OUT　　COOK IN　　WEEKLY MENU　　TASTE ADJUST　　OPTIONS

FIG.25

PLEASE TELL US HOW YOU LIKED YOUR PREVIOUS ORDERS:

948 — DISH　　　　　　　　　　　　　　950 — RATING:

| DISH | RATING |
|---|---|
| BAKED RED SNAPPER WITH SOUR CREAM STUFFING | ******REALLY LIKED IT ▶ |
| SOLE WITH MUSHROOMS | HAVEN'T TRIED IT ▶ |
| SOLE AUX AMANDES | HAVEN'T TRIED IT ▶ |
| APPLE-CELERY SALAD | HAVEN'T TRIED IT ▶ |
| SHRIMP WITH SNOW PEAS & WATER CHESTNUTS | HAVEN'T TRIED IT ▶ |
| SOLE-ASPARAGUS ROLLS WITH YOGURT SAUCE | **** ▶ |
| PARMESAN TUNA SPREAD | ***TOLERATED IT ▶ |
| PASTA WITH FRESH TUNA | HAVEN'T TRIED IT ▶ |
| POACHED HADDOCK | HAVEN'T TRIED IT ▶ |
| PRAWNS NEW ORLEANS | HAVEN'T TRIED IT ▶ |

952 — [SUBMIT]

FIG. 26A

EAT OUT   COOK IN   WEEKLY MENU   TASTE ADJUST   SPECIAL EVENTS   OPTIONS
PREFERENCES   USER PROFILE   GROUP SETUP   MODIFY RECIPES   ADJUST SCALING

| ATTRIBUTE | FACTOR | PRODUCT #1 SHRIMP PA | PRODUCT #2 CORNMEAL | DISTANCE 941.847 |
|---|---|---|---|---|
| PROTEIN | 100.0 | 6.2686653 | 3.210897 | 10.5% |
| TOTAL LIPID (FAT) | 30.0 | 5.6136746 | 3.7382727 | 0.4% |
| CARBOHYDRATE, BY DIFFERENCE | 50.0 | 18.593363 | 20.200994 | 0.7% |
| ASH | 1.0 | 0.38089907 | 0.42377165 | 0.0% |
| ENERGY | 0.1 | 159.67484 | 124.616776 | 0.0% |
| ALCOHOL | 30.0 | 1.1825509 | 0.0 | 0.1% |
| WATER | 40.0 | 26.454025 | 9.506108 | 51.8% |
| CAFFEINE | 1.0 | 0.0 | 0.0 | 0.0% |
| THEOBROMINE | 1.0 | 0.0 | 0.0 | 0.0% |
| SUGARS, TOTAL | 100.0 | 0.07629361 | 0.0 | 0.0% |
| FIBER, TOTAL DIETARY | 5.0 | 0.5896591 | 1.9059237 | 0.0% |
| CALCIUM, Ca | 0.1 | 14.850088 | 6.482775 | 0.0% |
| IRON, Fe | 1.0 | 1.3624313 | 1.0240114 | 0.0% |
| MAGNESIUM, Mg | 10.0 | 18.769089 | 34.076607 | 2.6% |
| PHOSPHORUS, P | 1.0 | 70.95631 | 78.71148 | 0.0% |
| POTASSIUM, K | 10.0 | 79.4755 | 86.31282 | 0.5% |
| SODIUM, Na | 10.0 | 25.356628 | 42.697693 | 3.4% |
| ZINC, Zn | 1.0 | 0.4767058 | 056933755 | 0.0% |

FIG.26B

| | | | | |
|---|---|---|---|---|
| COPPER, Cu | ☐ +- | - - - - - | - - - - - | % |
| MANGANESE, Mn | ☐ +- | - - - - - | - - - - - | % |
| SELENIUM, Se | ☐ +- | - - - - - | - - - - - | % |
| VITAMINE A, IU | ☐ +- | - - - - - | - - - - - | % |
| VITAMINE E | ☐ +- | - - - - - | - - - - - | % |
| VITAMINE C, ASCORBIC ACID | ☐ +- | - - - - - | - - - - - | % |
| THIAMINE | ☐ +- | - - - - - | - - - - - | % |
| RIBOFLAVIN | ☐ +- | - - - - - | - - - - - | % |
| NIACIN | ☐ +- | - - - - - | - - - - - | % |
| VITAMINE B-6 | ☐ +- | - - - - - | - - - - - | % |
| FOLATE | ☐ +- | - - - - - | - - - - - | % |
| VIATMINE B-12 | ☐ +- | - - - - - | - - - - - | % |
| TRYPTOPHAN | ☐ +- | - - - - - | - - - - - | % |
| THREONINE | ☐ +- | - - - - - | - - - - - | % |
| ISOLEUCINE | ☐ +- | - - - - - | - - - - - | % |
| LEUCINE | ☐ +- | - - - - - | - - - - - | % |
| LYSINE | ☐ +- | - - - - - | - - - - - | % |
| METHIONINE | ☐ +- | - - - - - | - - - - - | % |
| CYSTINE | ☐ +- | - - - - - | - - - - - | % |
| PHENYLALANINE | ☐ +- | - - - - - | - - - - - | % |
| TYROSINE | ☐ +- | - - - - - | - - - - - | % |
| VALINE | ☐ +- | - - - - - | - - - - - | % |
| ARGININE | ☐ +- | - - - - - | - - - - - | % |
| HISTIDINE | ☐ +- | - - - - - | - - - - - | % |
| ALANINE | ☐ +- | - - - - - | - - - - - | % |
| ASPARTIC ACID | ☐ +- | - - - - - | - - - - - | % |
| GLUTAMIC ACID | ☐ +- | - - - - - | - - - - - | % |

FIG.26C

| | | | | | |
|---|---|---|---|---|---|
| GLYSINE | ☐ | +/− | ----- | ----- | % |
| PROLINE | ☐ | +/− | ----- | ----- | % |
| SERINE | ☐ | +/− | ----- | ----- | % |
| CHOLESTEROL | ☐ | +/− | ----- | ----- | % |
| FATY ACIDS, SATURATED | ☐ | +/− | ----- | ----- | % |
| 4:0 | ☐ | +/− | ----- | ----- | % |
| 6:0 | ☐ | +/− | ----- | ----- | % |
| 8:0 | ☐ | +/− | ----- | ----- | % |
| 10:0 | ☐ | +/− | ----- | ----- | % |
| 12:0 | ☐ | +/− | ----- | ----- | % |
| 14:0 | ☐ | +/− | ----- | ----- | % |
| 16:0 | ☐ | +/− | ----- | ----- | % |
| 20:0 | ☐ | +/− | ----- | ----- | % |
| 18:1 | ☐ | +/− | ----- | ----- | % |
| 18:2 | ☐ | +/− | ----- | ----- | % |
| 18:3 | ☐ | +/− | ----- | ----- | % |
| 20:4 | ☐ | +/− | ----- | ----- | % |
| 22:6 | ☐ | +/− | ----- | ----- | % |
| 22:0 | ☐ | +/− | ----- | ----- | % |
| 14:1 | ☐ | +/− | ----- | ----- | % |
| 16:1 | ☐ | +/− | ----- | ----- | % |
| 18:4 | ☐ | +/− | ----- | ----- | % |
| 20:1 | ☐ | +/− | ----- | ----- | % |
| 20:5 | ☐ | +/− | ----- | ----- | % |
| 22:1 | ☐ | +/− | ----- | ----- | % |
| 22:5 | ☐ | +/− | ----- | ----- | % |

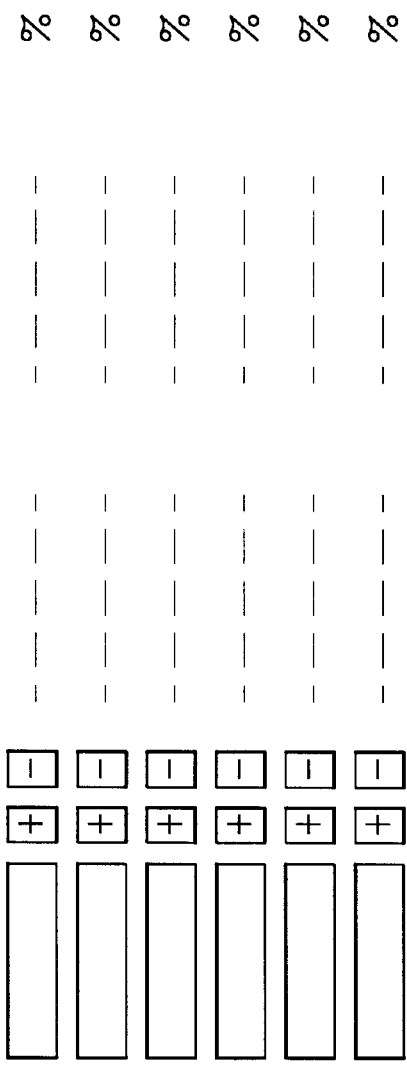

FIG. 28

| QTY. | UNIT | INGREDIENT | |
|---|---|---|---|
| RECIPE NAME | ENCHILADA CASSEROLE | USE INGREDIENTS | |
| 0.25 | CUP | SOUP, CHICKEN BROTH, CANNED, | CLEAR |
| 0.75 | CUP | ONIONS, CHOPPED | CLEAR |
| 2.0 | MEDIUM | GARLIC, RAW | CLEAR |
| 1.5 | LB | TURKEY, GROUND, RAW | CLEAR |
| 12.0 | MEDIUM | TORTILLAS, CORN | CLEAR |
| 8.0 | OZ | CHEESE, CHEDDAR | CLEAR |
| 0.0 | | | CLEAR |
| 0.0 | | | CLEAR |
| 0.0 | | | CLEAR |
| 0.0 | | | CLEAR |
| 0.0 | | | CLEAR |
| 0.0 | | | CLEAR |

MAP —982

METHOD AND APPARATUS FOR AUTOMATED SELECTION, ORGANIZATION, AND RECOMMENDATION OF ITEMS

CROSS-REFERENCE TO RELATED APPLICATIONS

This application is a continuation-in-part of application Ser. No. 09/131,146, filed on Aug. 7, 1998, now U.S. Pat. No. 6,263,974 now pending, which in turn claims priority of provisional application No. 06/055,023, filed on Aug. 8, 1997, disclosures of which are incorporated herein by reference.

FIELD OF THE INVENTION

The present invention relates in general to a computer system for automatically recommending items to a user. More specifically, the invention relates to a computer system that maintains a preference vector depicting an individual's preferences based on previously sampled items, and makes recommendations of other items according to the preference vector.

BACKGROUND OF THE INVENTION

There are a number of situations in which a person would like to know whether he or she will like an item before expending time and money sampling the item. For instance, when a person must decide on the next book to read, CD to listen, movie to watch, painting to purchase, or food to eat, he or she is often faced with a myriad of choices. The resources available in determining which of these choices will be to his or her liking pales in comparison to the number of choices that exist. Furthermore, the methods that do exist for helping a person determine whether the individual will like an item have limited accuracy given that such methods are often based on the preferences of other people rather than on the preferences of the individual himself. For instance, movie critics, book reviewers, and other types of critics recommend items based on their personal tastes. It is then up to the person to find a critic whose taste matches the individual's taste before following the selected critic's recommendations. Such a match may be hard or even impossible to find.

Previews and short synopses also provide information about an item, but it is hard for a person to determine whether he or she will like the item based on the limited information provided by these means. Furthermore, reading each synopsis or viewing each preview becomes time-consuming and inefficient if the individual is faced with a multitude of options, such as when the individual is in search of a book to purchase next from a bookstore.

As another example, individuals are often faced with a decision as to what to cook for dinner. In today's environment most families consist of either two working spouses or a single working parent. As a consequence, at least one parent must come home from a long day at work and tackle the decision of what to make for dinner. Since the parent usually gets home from work around dinner time, the children and other family members are usually already hungry and tired. This situation often puts much stress on family members, in particular, the parent tasked with determining what meal to prepare (the primary care providing parent). The primary care providing parent is often pressured to prepare something quickly. Under this pressure, the parent opts most of the time for something simple and quick—if they have all the ingredients that they need to prepare the meal. If the parent does not have all the ingredients, he or she must make a trip to the store or figure out what they can make out of the ingredients at home. As a consequence of this situation, the family's menu is unimaginative. The family will therefore typically end up eating the same food over and over again, or the family will eat food from the same outside vendor (take-out).

The stress on the primary care providing parent would diminish if a maid were hired to perform the meal preparation task. However, only certain families can afford the luxury of a maid. The above problems would also not exist if the primary care providing parent were not to work. The stay-home-parent could select a meal, buy the necessary ingredients, and have the food prepared by the time everyone else in the family returned home. This solution may also not be feasible if both spouses enjoy their work and neither one wants to give up his or her career. Furthermore, in many situations, it may not be economically feasible to have only one parent working.

Although automated recommendation systems and methods exist in the prior art which may aid an individual in making decisions such as what meal to cook, what book to buy, or what movie to watch, such systems are based on the preferences of other users, and are not based solely on the preferences of the users for whom the recommendations are to be made. For instance, prior art exists which discloses a method of recommendation where a selected user provides rating of sampled products (e.g. movies) and the system locates other user(s) whose preference have the closest match to the selected user's ratings. Such other users are considered as "recommending users." Recommendations to the user of unsampled products are based on the ratings of such products by the recommending users.

Prior art also exists which discloses a method of recommending items based on a selected user's input list which lists items previously sampled by that user which the individual has liked. The system determines how often the items indicated by the user appear together on the input lists of previous consumers, and makes recommendations based on this information.

The recommendation systems disclosed the prior art, however, have limited accuracy because the recommendations are not made based solely on the user's preferences, but also depend on the preferences of other users. It is therefore desirable to have an automatic system and method of recommending items to a person which are based solely on the user's preferences. This will help prevent the individual from having to sample the item before determining whether or not it agrees with the individual's tastes. With such a system, furthermore, it will no longer be necessary to try to predict an individual's reaction to a product based on the preferences of other people.

If the system is to be used for recommending recipes for a family, it is desirable to have a system that will recommend recipes based on the tastes of all the family members. Just as a good maid or a stay-at-home parent, the system should learn and adapt to the family's food preferences, and make the meal selections accordingly. In addition, just as a maid or stay-at-home parent, the system would also track what meals the family has eaten in the past to avoid needless repetition.

SUMMARY OF THE INVENTION

These and other objects are accomplished in accordance with the present invention by an automated recommendation system that maintains a preference vector for each user depicting his or her preferences based on previously sampled items. The system then makes recommendations of other items according to the preference vector.

In accordance with one aspect of the invention, initial setup questions are asked to the user to initialize his or her user's preference vector. The user preference vector comprises vector fields that represent the user's preferences for particular item attributes. Items are then recommended based on the user preference vector. This vector is modified based on the feedback from the user about the recommended items, allowing the system to learn and adapt to the user's preferences.

In one particular aspect of the invention, the user preference vector comprises two kinds of fields: exclusive fields and inclusive fields. Exclusive fields are used to depict attributes not to be contained in the recommended products. Inclusive fields are used to store values reflecting a user's degree of preference for certain attributes.

An item to be recommended is represented as a product vector. During the recommendation process, an item's product vector is compared against a user preference vector to determine how close the item matches the user's preferences. Item with the closest match are the recommended to the user.

The creation of product vectors for recommending dishes includes parsing an original recipe for its ingredients. These ingredients are mapped to the chemical components making up the ingredients. The value of each chemical component is then stored into the inclusive preference fields of the product vector.

In another aspect of the invention, recommendations are made based on a cluster vector where the cluster vector represents a group of items with similar characteristics and which are among the highest rated items sampled by the user.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

These and other features and advantages of the present invention will be appreciated as the same become better understood by reference to the following Detailed Description when considered in connection with the accompanying drawings, wherein:

FIG. 7 is an exemplary flow chart of a process for determining if a particular item is suitable for recommendation according to an embodiment of the present invention;

FIG. 13 is an exemplary product database GUI for creating product vectors based on the exemplary attributes of FIG. 12;

FIG. 14 is an exemplary question setup GUI for initializing a user preference vector;

FIG. 18 is an exemplary user registration GUI according to one embodiment of the present invention;

FIG. 19 is an exemplary GUI for allowing entry of user preference information according to one embodiment of the present invention;

FIG. 25 is an exemplary GUI for receiving feedback from a user in regards to a recommended recipe;

FIGS. 26A–26D are exemplary GUIs for adjusting the weight of chemical compositions appearing in a recipe;

FIG. 28 is an exemplary GUI for adding or modifying ingredients of a recipe in accordance with one embodiment of the present invention.

DETAILED DESCRIPTION

Figure 1:
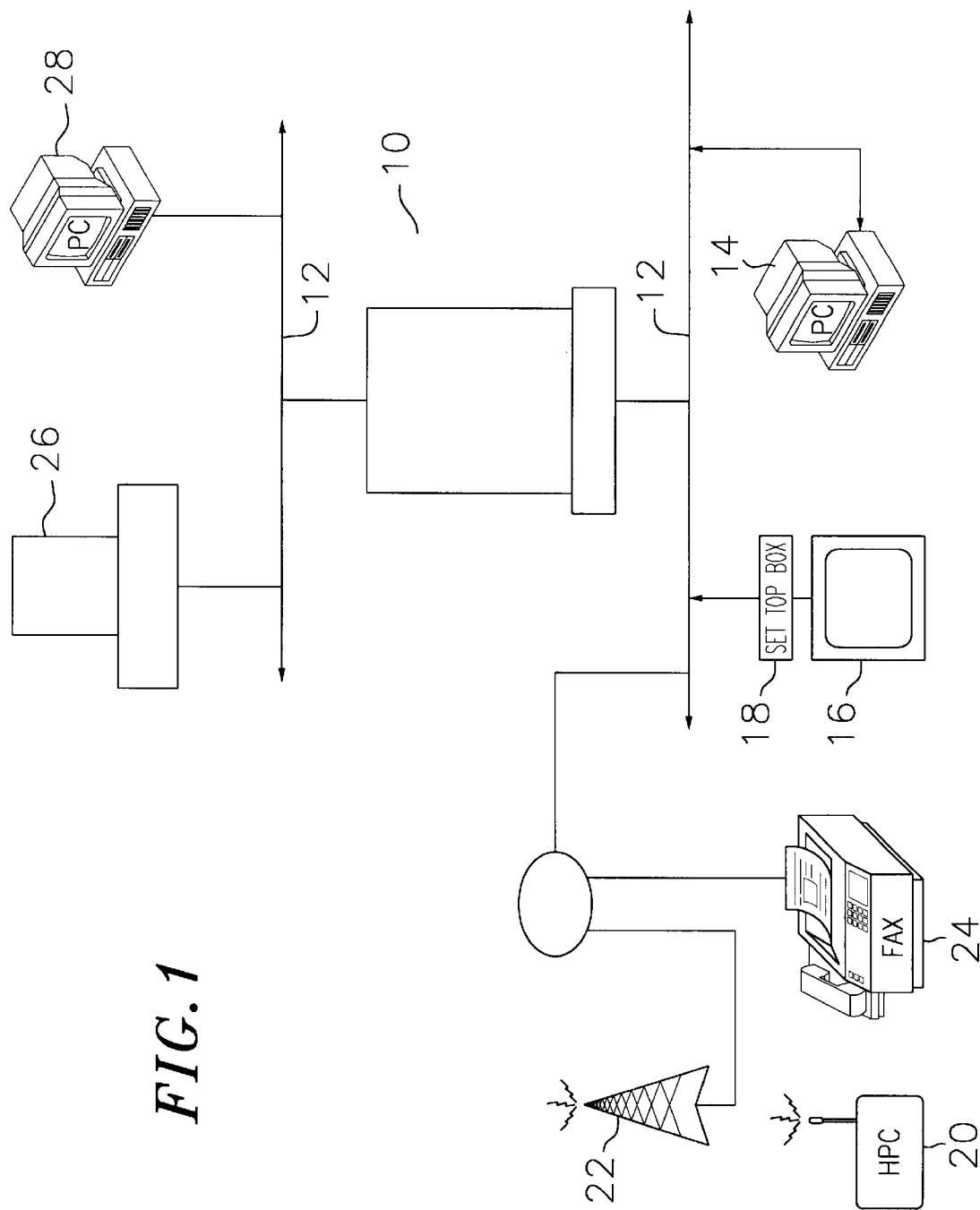
FIG. 1 is an exemplary block diagram of a recommendation system in accordance with the present invention.

FIG. 1 depicts a simplified, semi-schematic block diagram of an exemplary automatic recommendation system for making recommendations of products or services which cater to an individual's tastes. The system comprises a network server or platform computer 10 which includes a user interface for allowing individuals to enter preferences and view recommendations made by the system. The network server or platform computer 10 also includes a user interface for allowing retailers to submit to the system, information about potential products and services which may be recommended to the users of the system. This user interface might be configured as a web-page, electronic mail, fax, or a customer service representative with access to the system.

Both individuals seeking recommendation, as well as retailers submitting product information, are in communication with the network server or platform computer 10 through an Internet connection 12. The Internet connection 12 might comprise telephone lines, ISDN lines, ADSL lines, DSL lines, R/F communication, satellite, television cable, and the like. Individuals seeking recommendation might use a personal computer 14 equipped with a modem (not shown) to access the Internet connection 12. Alternatively, a television 16 equipped with a digital or analog set top box 18 with Internet capabilities, such as one sold under the trademark WebTV® by Philips-Mangavox and Sony, might be used for connection to the Internet.

Individuals might alternatively use a hand-held personal computer ("HPC") 20 to communicate with the recommendation system. Thus, a user dining at a restaurant or shopping at a store may access the recommendation system to decide what dish to order, or what item to purchase. The HPC includes a wireless modem which communicates with a wireless network service 22 via RF signals. The HPC might also be replaced with a hand-held device acting as a mobile, wireless monitor receiving recommendation information from the system. Recommendation information may further be received by fax 24, e-mail, or any other known means of communication.

The network server or platform computer 10 also communicates with retailers over the Internet connection 12. The Internet connection 12 at the retailer's site allows a retailer to submit product and service information to the system for recommendation to the individuals. The retailers might use a network server 26 or personal computer 28 to transmit this information to the system. It is noted, however, that any of the Internet connection methods described above in conjunction with devices accessible to individuals may also be employed to provide Internet access to the retailers.

Figure 2:
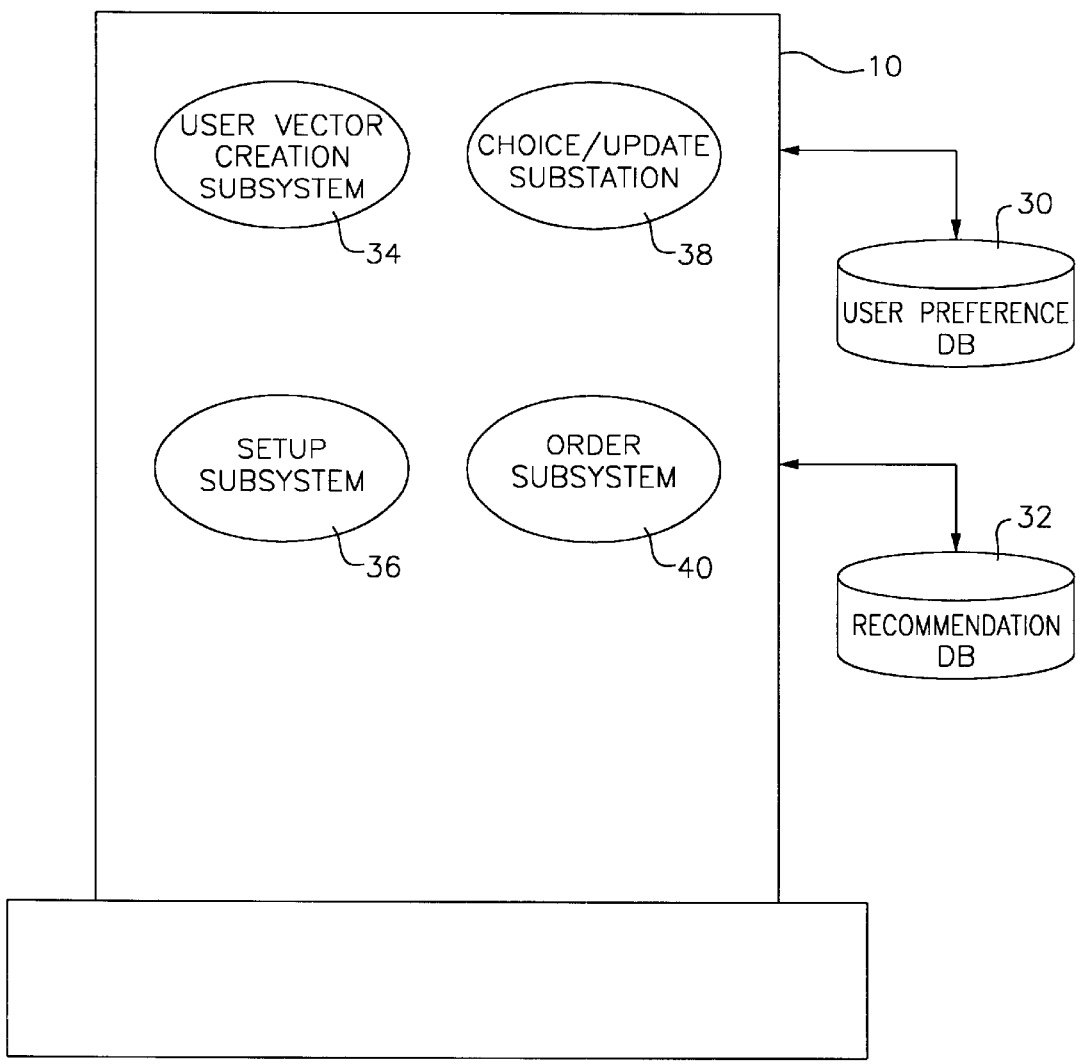
FIG. 2 is an exemplary user vector creation and update subsystem of FIG. 1.

FIG. 2 is an exemplary block diagram showing the system's network server or platform computer 10 in greater detail. The system hosts at least a user preference database 30 and a recommendation database 32. In the illustrated embodiment, the two databases reside in two separate mass storage devices, each taking the form of a hard disk drive or drive array. It is noted, however, that the two databases may also reside in a single mass storage device.

The user preference database 30 stores one or more user preference vectors for each individual. Associated with each preference vector is a user identification number or insignia, distinguishing one user's preference vector from another's.

According to one embodiment of the invention, the user preference vector comprises a series of fields (or positions) that represent the individual's preferences for particular attributes related to an item. For instance, a user's music preference vector may include separate fields to represent the user's preference for piano music, guitar music, music beat, music popularity, etc. Several preference vectors may be maintained for each user. For instance, the system may maintain one or more preference vectors for the user's taste in food and one or more preference vectors for the user's taste in movies. These preference vectors are updated as the system learns more about the user's reactions on previously sampled items.

Figure 3:
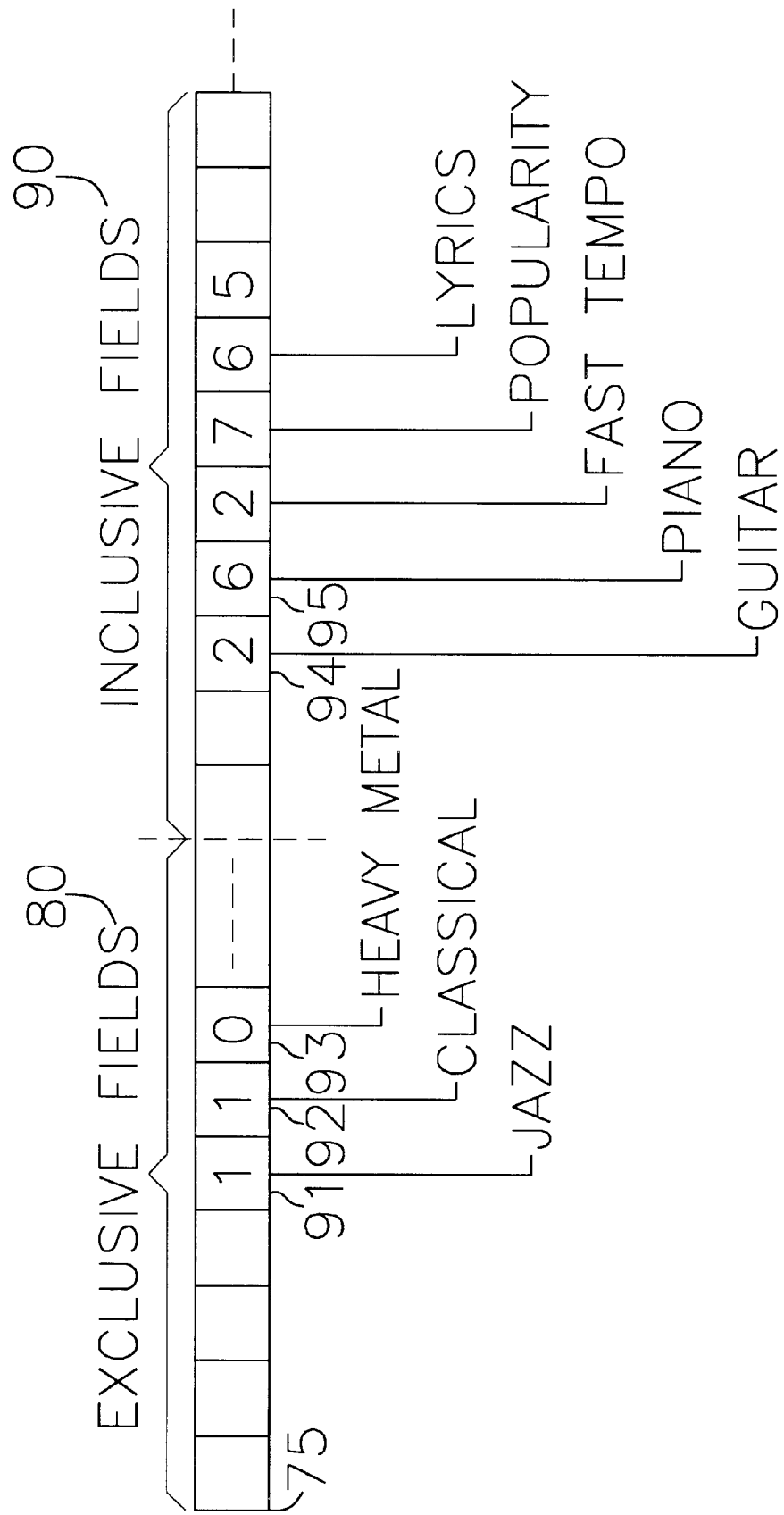
FIG. 3 is an exemplary data structure for containing user preferences (a user preference vector) in accordance with an embodiment of the present invention.

FIG. 3 illustrates an exemplary user preference vector 75 representing a user's taste in music. The vector 75 is divided into exclusive fields 80 and inclusive fields 90. The exclusive fields 90 depict specific attributes or categories of items to exclude in making a recommendation. In the user preference vector of FIG. 3, the exclusive field for Jazz music 91 and the exclusive field for Classical music 92, are set to "1", indicating the user's desire to exclude these types of music from the items recommended. On the other hand, the exclusive field for Heavy Metal 93 is set to "0", indicating that heavy metal music is not to be excluded during the search of items to recommend.

Inclusive fields 90 indicate a user's degree of preference with respect to a particular attribute. In the illustrated music preference vector, each inclusive field 90 contains a number on a scale of one to ten, with the number one indicating a lowest degree of preference, and the number ten indicating the highest degree of preference. In an alternate embodiment, the scale of each inclusive field may differ to provide more or less granularity. For instance, the scale for one field may contain a number on a scale of one to ten, while another field may contain a number on a scale of one to a hundred. Certain inclusive preferences may further be given higher or lower weights in comparison to others.

Figure 4:
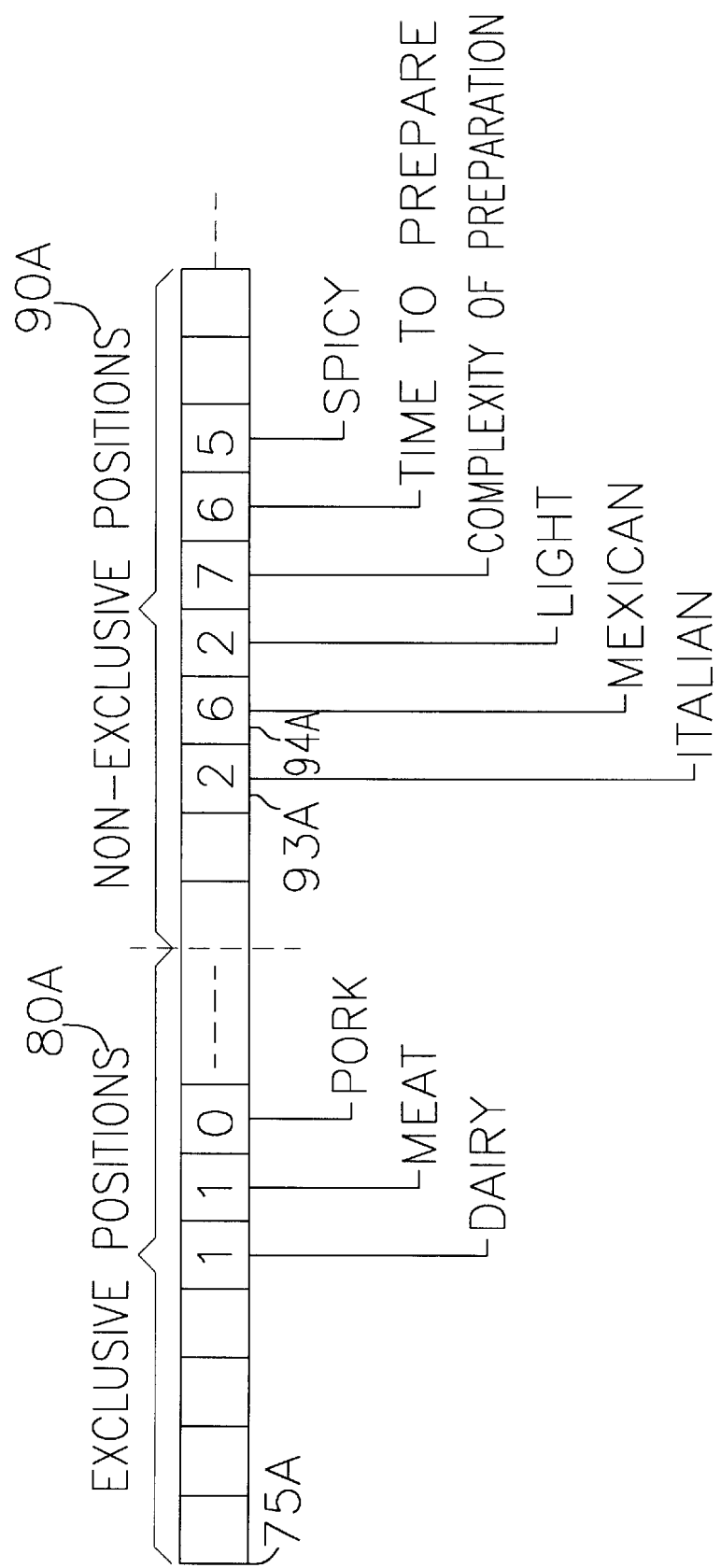
FIG. 4 is an exemplary food preference vector in accordance with an embodiment of the present invention.

FIG. 4 illustrates a user's food preference vector 75A used for recommending recipes to the user. The exclusive positions represent non-waivable preferences relating to the dishes that are recommended. For example, if an exclusive position 80A in the preference vector indicates that the user is vegetarian, the recipe selected must be a vegetarian recipe. The inclusive fields 90A indicate the user's degree of preference for certain types of foods or tastes.

Referring back to FIG. 2, the recommendation database 32 stores a product vector for each item capable of being recommended by the system. Each product vector is identified by the product's name. During a recommendation process, the system compares the product vectors in the recommendation database 32 with the user preference vector in the user preference database 30, and selects products with the closest match to the user's preferences, as is described in further detail below.

According to one embodiment of the invention, the product vector includes the same exclusive fields and inclusive fields as the corresponding user preference vector. Thus, a product vector for a CD, tape, or musical piece, will have the appropriate exclusive fields set based on the type of CD, tape, or musical piece. Furthermore, such product vector will also have the appropriate inclusive fields set based on the specific attributes (lyrics, popularity, tempo, etc.) contained or related to the product.

In an alternative embodiment, the product vector includes only the inclusive fields of the corresponding user preference vector. According to this embodiment, the product vectors are stored under appropriate categories based on the type of product being represented. The categories are associated with the exclusive fields in the user preference vector. Thus, a product vector for a classical CD is stored under a Classical category while a product vector for a Heavy Metal CD is stored under a Heavy Metal category.

Figure 5:
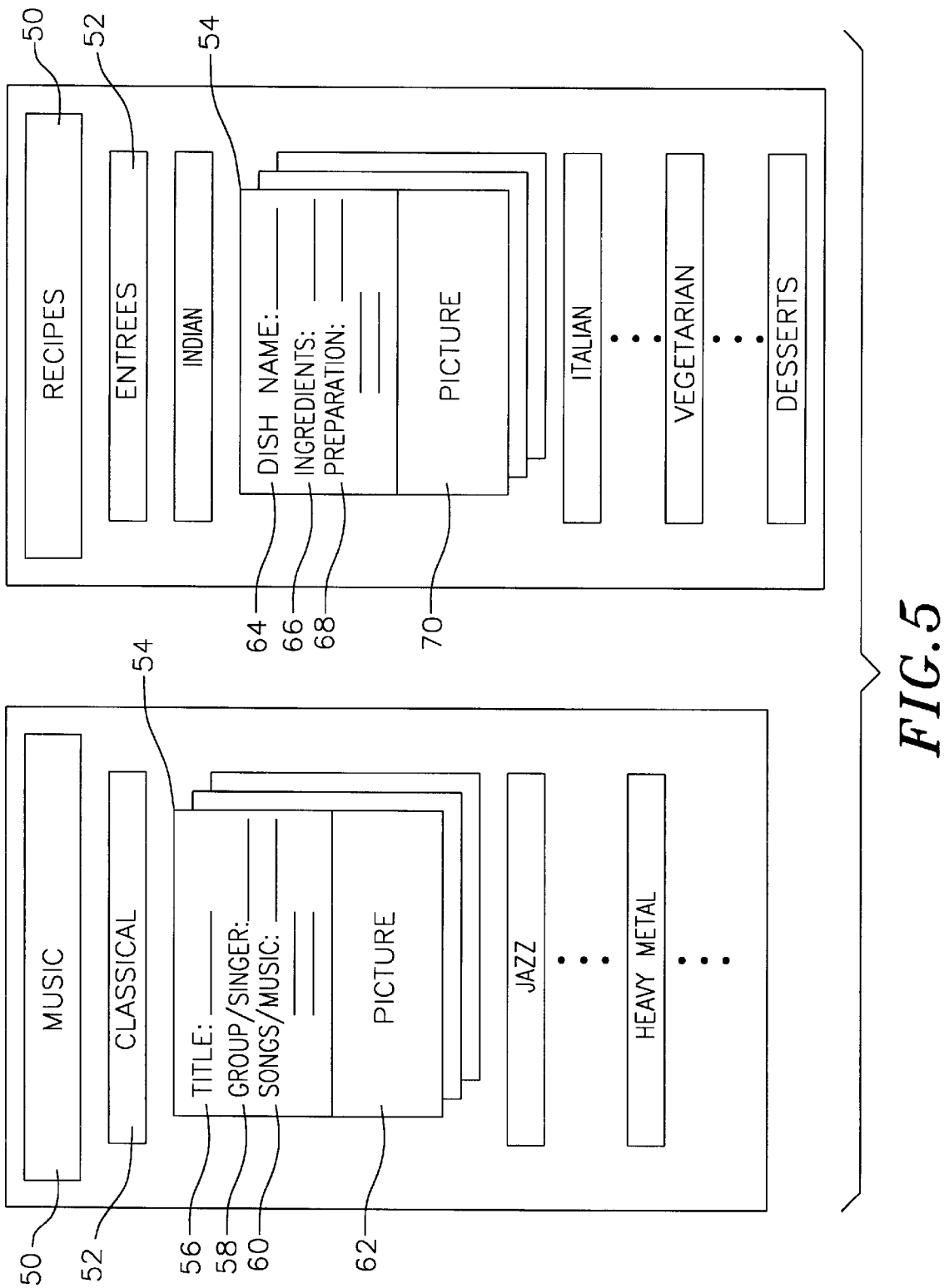
FIG. 5 is a conceptual layout diagram detailing the organization of product information in a recommendation database.

Each product vector is further associated with additional information about the product also stored in the recommendation database 32, or alternatively, in a separate database. FIG. 5 is a conceptual layout diagram detailing the organization of product information in the recommendation database 32. As illustrated in FIG. 5, the products are categorized into broad categories 50, such as music, movies, recipes, books, and the like. The broad categories 50 are further divided into one or more sub-categories 52 for further categorizing the products. According to one embodiment of the invention, the sub-categories 52 are the exclusive fields of the product vector. Thus, a music category 910 is further divided into, for instance, Classical, Jazz, and Heavy Metal sub-categories 52. A recipes category is divided into Entree, Appetizer, Soup, Salad, and Dessert sub-categories. The Entree sub-category is further divided into Indian foods, Italian foods, Vegetarian foods, and the like. It is noted at this point, that other organization methods may also be utilized, such as organizing the products alphabetically within each broad category 50. Alternatively, the recipes category may be divided into eating type, dish type, meal type, diets, ethnicity, and ingredients.

Each category 50 or sub-category 52 in the recommendation database 32 comprises a series of product-specific records (identified generally at 54). For instance, a product record 54 in the music category is headed by the title of the CD/music 56. The title is followed by the name of the group/singer 58, and the list of songs/music 60 contained in the CD. The product record 54 further includes an information storage area 62 for maintaining graphic data of an image of the CD, group/singer, or other images related to the product.

A product record 54 in the recipes category, on the other hand, is headed by a dish name 64. The dish name is followed by the list of ingredients 66, preparation instructions 68, and graphic data of an image of the prepared dish. Alternatively, rather than maintaining all the information relating to a product within the local database 16, a product record 54 may simply contain a pointer to a web page stored in an offsite database. The web page will contain the product information that would otherwise be stored in the product record 54.

User Vector Creation Subsystem

Figure 6A:
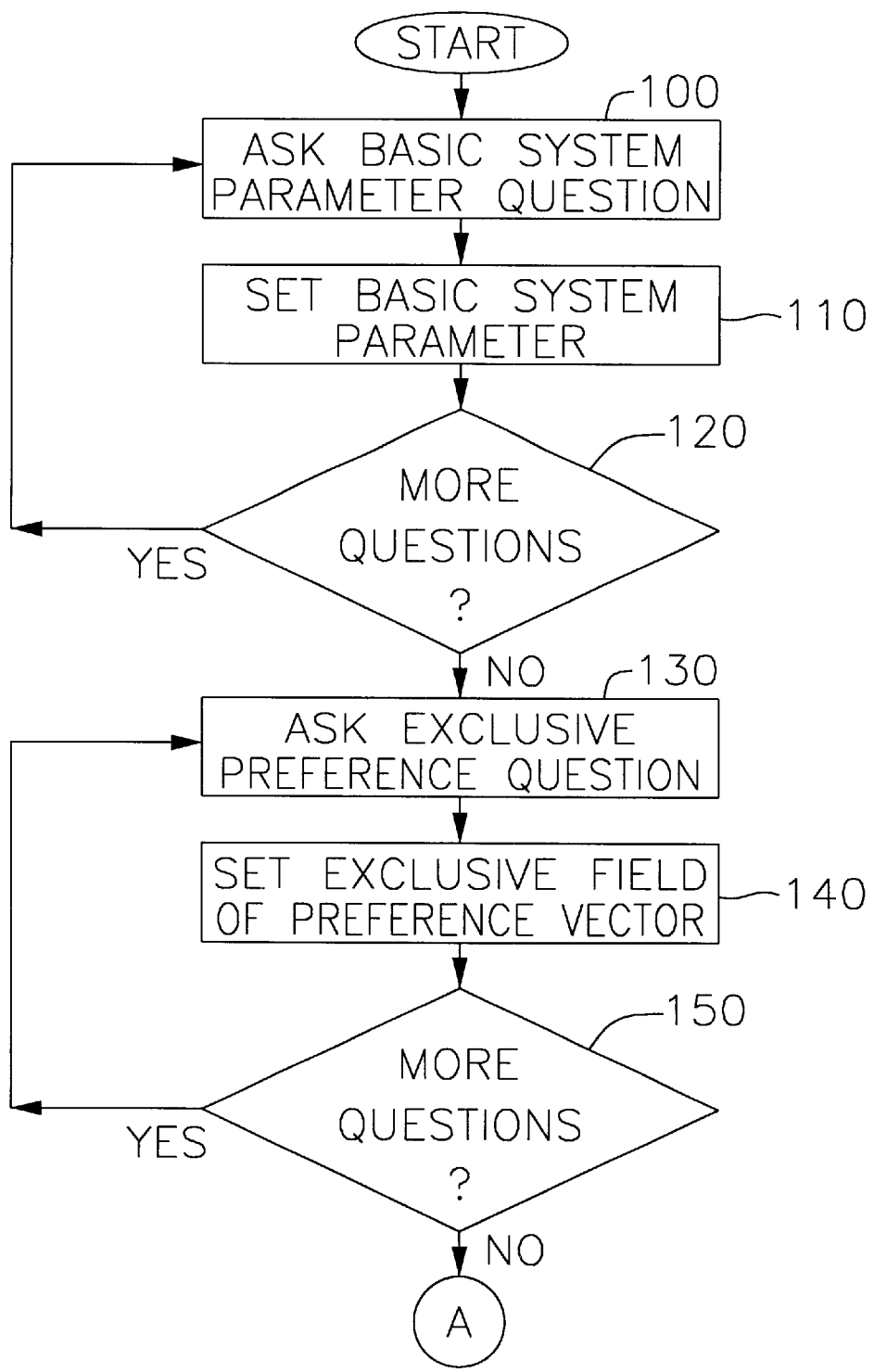
FIGS. 6A–6B are exemplary flow charts of a process for initializing a user preference vector.
Figure 6B:
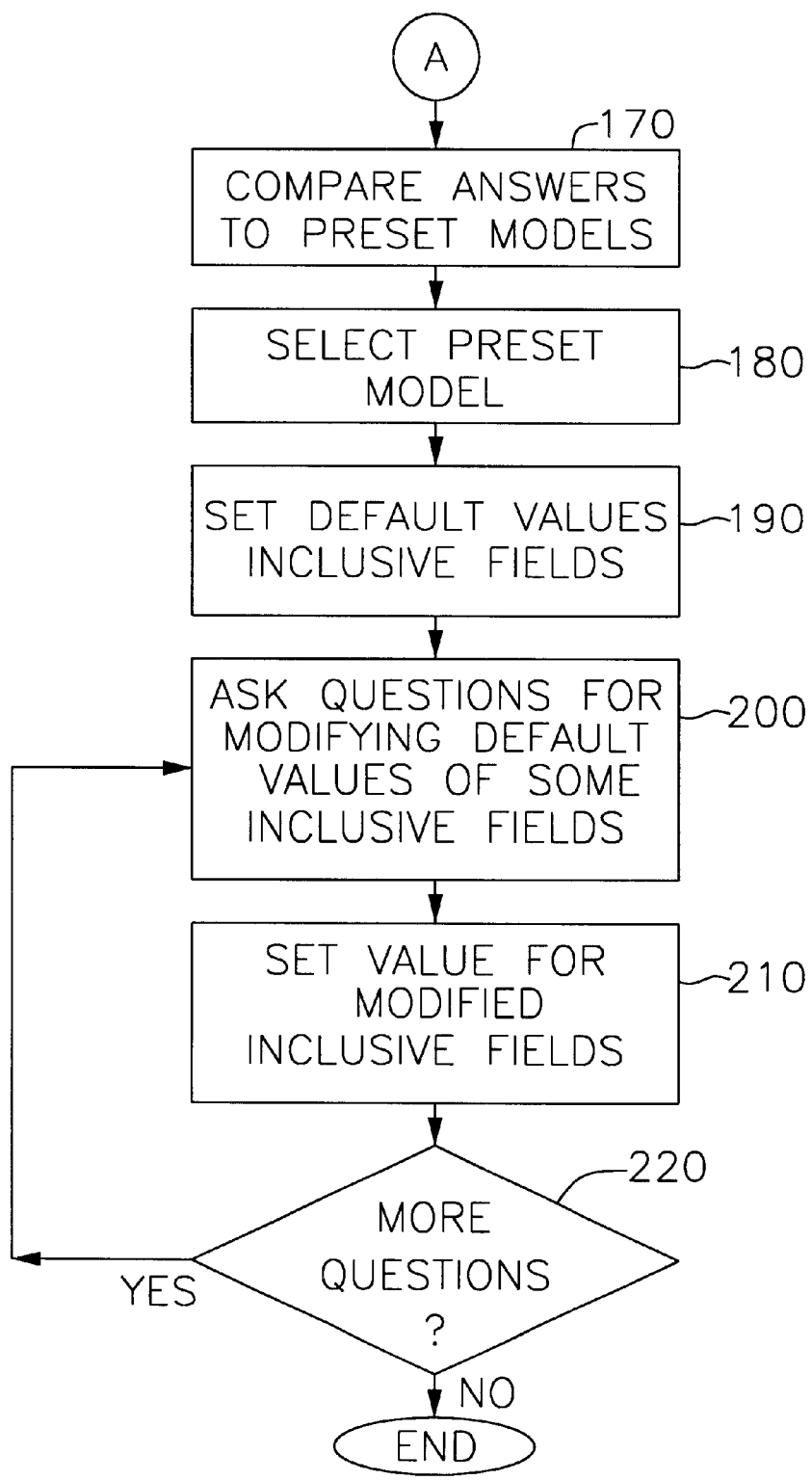

Referring back to FIG. 2, a user vector creation/update subsystem 34 allows the creation and update of user preference vectors. FIGS. 6A–6B are generalized flow diagrams of a user preference vector initialization routine engaged by the subsystem 34 according to an embodiment of the present invention. The routine is described in terms of a computer program.

To initialize the preference vector 75 for a first time user of the system, the computer program asks setup questions to obtain the user's general preferences. The answers are then utilized for an initial setting of the values of his or her preference vector 75.

The initial preference vector setting process starts by asking a basic system parameter question in step 100. Such questions are created by a systems programmer through a setup subsystem 36, as is described in further detail below. A system parameter question for setting a user's music preference vector may inquire about the user's age, gender, and occupation, the CDs or tapes already owned by the user, and the radio stations the user enjoys the most. A system parameter question for setting a food preference vector for recommending dishes to a family may inquire about the number of family members, their ages, weights, and sexes; the number of meals planned per day; the time when meals should be ready; the amount of time the family wants to spend preparing food; the number of times per week the family wishes to get take-out food; the food budget; and whether the family would rather minimize the number of shopping trips taken or the amount of food in the home.

In step 110, the computer program sets a system parameter according to the user response to the question of step 100. In step 120, the program determines whether all the system parameter questions have been asked. If they have not, the program loops back to step 100 and the next system parameter question is asked.

When all the system parameter questions have been asked and answered, the program, in step 130, asks an exclusive preference question. Exclusive preference questions for initializing a user's music preference vector relate to the types of music preferred. For instance, the question may elicit information as to whether the user likes country, rap, Jazz or rock music.

Exclusive preference questions for initializing a family's food vector might relate to the kinds of foods that the family should avoid. For instance, the question may elicit information as to particular food items, such as meat, pork, lamb, or veal, that are to be avoided. The question may also relate to particular meal ingredients to avoid, such as salt, pepper, dairy products, egg yolks, or milk.

The computer program, in step 140, uses a user response to an exclusive preference question to set a corresponding exclusive field 80 in the user preference vector 75 (FIG. 3). The program then determines, in step 150, whether there are more exclusive preference questions to ask. If there are, the program loops back to step 130 where the next exclusive preference question is asked.

According to one embodiment of the present invention, answers to system parameter questions and exclusive preference questions are used to classify the user into a preset user model represented by a preset model vector. For instance, when setting a family's food preference vector, the computer program inquires whether more than one person will be doing the cooking, or whether the family is adventurous and willing to try a great variety of different foods. Additional questions may also be asked to more accurately classify a user into a preset user model. The preset model is used to set default inclusive fields 90 of the preference vector 75. Alternatively, all inclusive fields may be initialized to an average value by default.

In a system where a preset model is to be selected, the program, in step 170, takes the answers given to the basic system parameter questions and the exclusive preference questions, and any additional setup questions asked by the system, and compares them to the attributes of various preset models. A preset model which best characterizes the user is selected in step 180. In step 190, the program uses the preferences of the chosen model to set the default values of the inclusive fields 90 of the user preference vector 75.

Some exemplary family models used for initializing a family's food preference vector include:

1) Working Family with Children—characterized by moderate eating, desiring to dine out occasionally, cooking in the home most of the time, little time to cook, enjoys cooking on weekends.

2) Individual—characterized by mostly eating out, cooking only simple dishes.

3) Family with One Parent Not Working—characterized by cooking most of the time.

4) Young Two Member Family—characterized by mostly eating out and cooking occasionally for fun.

5) Experimentalist—characterized by wanting to try new food all of the time.

Once the default values have been set, the program, in step 200, asks inclusive preference questions to better represent the individual's preferences. The answers to these questions are used in step 210 to modify the default values of some of the inclusive positions 90. In setting the inclusive preference fields of a music preference vector, the questions may relate to the type of instrument the user likes, with instructions to rank certain types of instruments on a scale of one to ten. For example, the music preference vector 75 of FIG. 3 illustrates a user that prefers piano over guitar. The guitar preference field 94 is set to "2" whereas the piano preference field 95 is set as "6".

Questions may also be asked about the user's music preferences in general. These questions may include: "What is the most important attribute of the types of music you like?"; "What is your preference on the tempo of the music?"; "How important is the popularity of the music?"; and "Do you pay particular attention to the lyrics?" Such questions may affect one or more inclusive attributes.

In modifying default inclusive field values of a family's food preference vector, the computer program may inquire, for instance, the following: "Are any family members diabetic?"; "Are any family members on a low cholesterol diet?"; "Do any family members have a heart condition?"; "Are any of the family members trying to gain weight?"; "Are any of the family members trying to lose weight?"

Questions may also be asked about the type of food that the family likes. For instance, the user may be presented with various types of foods, such as Italian, French, Mexican, Chinese, Japanese, Mediterranean, etc., with instructions to rank the family's preference on a scale of one to ten. For example, the food preference vector 75A of FIG. 4 illustrates a family that prefers Mexican food over Italian food. The Italian food preference field 93A is set to "2" whereas the Mexican food preference field 94A is set as "6".

Questions may also be asked about the family's eating preferences in general. These questions may include: "What is the most important quality of a good meal?"; "The amount of food?"; "The flavor of the food?"; "The preparation time?"; "Does the family like salads?"; "Does the family like appetizers?"; "Does the family like sandwiches?"; "Does the family like snacks?"; "Does the family like to eat out?"; "Does the family like to eat on the run?"; "Does the family like deserts?"; "Does the family like wine with dinner?"

In step 220, the program determines whether all the questions for modifying default values of certain inclusive vector positions have been asked. If all the questions have been asked and answered, the initial user preference vector 75 has been set, and the program ends. The initial user preference vector 75 is used by the system to make an initial recommendation to the user. As the user utilizes the system over time, the system learns and adapts to the individual's tastes through feedback from the user.

Choice/Update Subsystem

Referring again to FIG. 2, a choice subsystem resident in the system's server or platform computer 10 allows recommendation of items in the recommendation database 32 based on a user preference vector 75. FIG. 7 is a flow chart of an exemplary process engaged by the choice subsystem 38 for determining if a particular item in the recommendation database 16 is suitable for recommendation. Although the illustrated process describes the method of making recommendations based on one user preference vector, the same process applies to making recommendations based on multiple preference vectors or cluster vectors. Cluster vectors are described in further detail below.

The computer program, in step 400, inquires whether there are any items in the recommendation database 32 to examine. If there are, the program, in step 410, selects an item from the database 32. In step 420, the program compares the exclusive vector positions of the selected item's product vector against the exclusive vector positions of the user preference vector. A match is determined to exist in step 430 if the exclusive positions of the selected item's product vector are set to the same values as the positions in the user preference vector. If one of the exclusive positions does not match, then the item is rejected for recommendation. If all of the exclusive positions match, the rest of the positions in the product vector, that is, the inclusive positions, are used in step 440 to calculate a suitability weight. The suitability weight represents how well the item matches with the user's preferences. In the described embodiment, the vector distance between a product vector and the user vector determines the suitability weight. The closer the vector distance, the higher the suitability weight. The vector distance is calculated according to the following formula:

$$\sqrt{S1^2(Y1-X1)^2 + S2^2(Y2-X2)^2 + \ldots + Sn^2(Yn-Xn)^2}$$

where Y1, Y2, . . . , Yn are values in the fields of the user preference vector, X1, X2, . . . , Xn are values in the fields of the product vector, and S1, S2, . . . , Sn are scaling coefficients. Each scaling coefficient is associated with a field in the user preference vector and/or the product vector, and is indicative of the degree of impact the attribute associated with the field has in defining a user's taste and/or a product's characteristic.

According to another embodiment, of the invention, the suitability weight is a scalar product of the inclusive fields of the user preference vector and the inclusive fields of the item's product vector, namely, S1X1Y1+S2X2Y2+ . . . +SnXnYn. Other methods of calculating the suitability weight known to a person skilled in the art may also be utilized instead of the above-described methods.

In step 450, a selected item is placed in a list of suitable items sorted according to their suitability weights, and the program loops back to step 400 to determine whether there are any more items to consider. The top items in the list of suitable items are, therefore, the items with a closest match to the user's preferences.

For certain items, it may be desirable to keep track of the recommended items actually sampled by the user, as well as when the sampling took place. For instance, in a recipe recommendation system, it may be desirable to keep a time factor attached to each sampled recipe to prevent recipes from being recommended too often. This helps to add variety to a user's menu. According to one embodiment of the invention, the time factor changes from zero to a value between zero and one. The system remembers when an item was last used by storing the date the item was sampled. The system also has a standard number of days after which an item can be used again. If the item has not been used within this time, the time factor for the item is set to one. Otherwise, the time factor is set to a fraction of one based on the number of days it was last used. For example, for a system where the standard number of days is set to ten, an item that has not been used in the past ten days will have one as its time factor. On the other hand, an item that was used only five days ago will have its time factor set to 0.5. According to this embodiment, the program asks in step 460 whether there are any more items in the sorted list of suitable items on which to perform a time factor calculation. If there are, the program, in step 470, multiplies the suitability weight of a current item in the list with a corresponding time factor. This process continues until the suitability weights of all the items in the sorted list have been recomputed based on their time factors. The list is then rearranged in step 480 based on the new calculations.

In step 490, the program recommends the top items from the sorted list. The actual number of items recommended is predetermined by either the user or systems programmer. According to one embodiment of the invention, the top seven items are recommended as the menu for the week.

Figure 8:
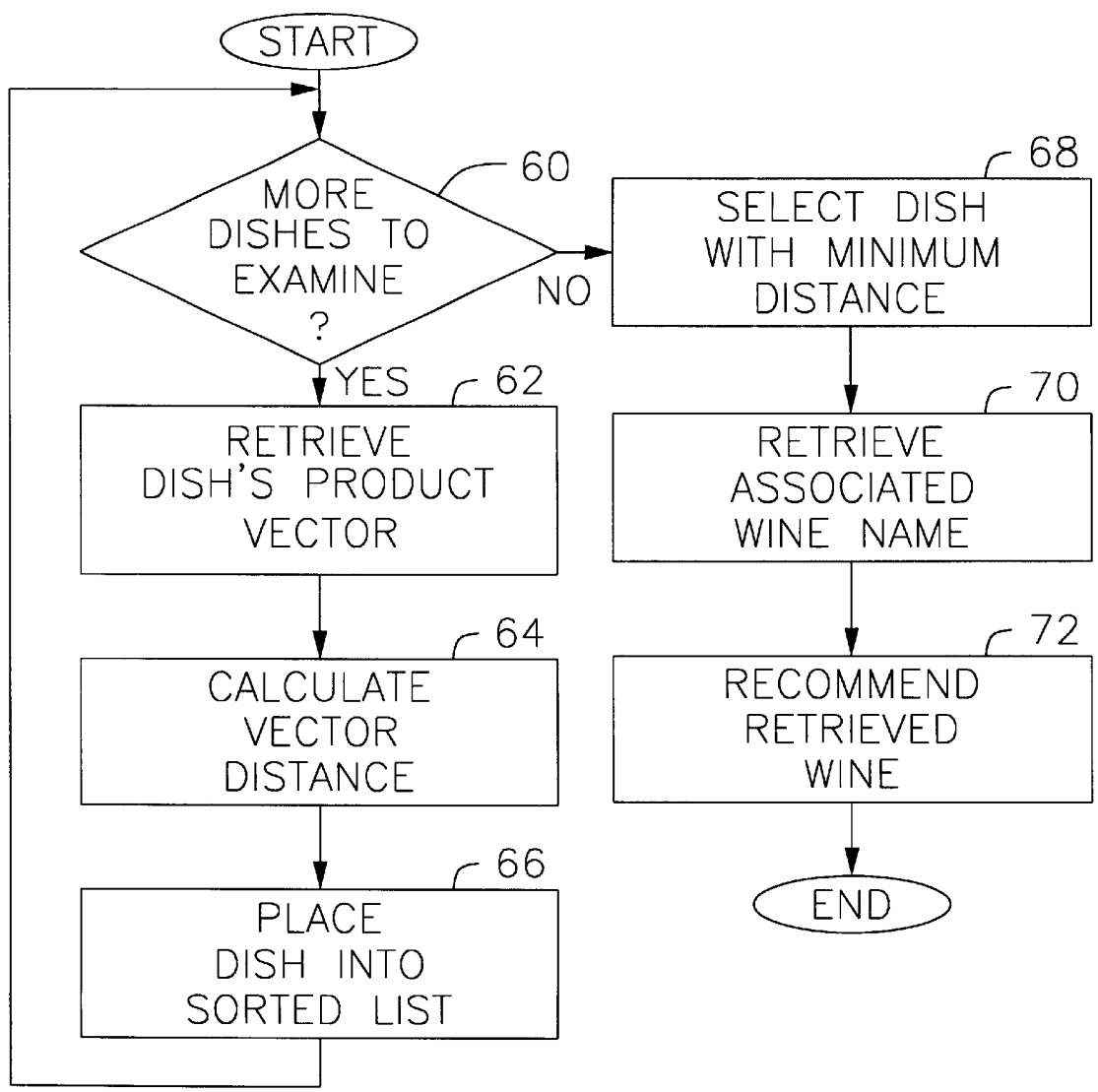
FIG. 8 is an exemplary flow chart of a process for recommending wines to complement a recommended dish.

In a recipe recommendation system, the system may also recommend wines which may most likely complement a recommended dish. FIG. 8 is a flow diagram of a computer program for recommending wines, in accordance with one embodiment of the invention. According to this embodiment, the system maintains a preset list of dishes along with the name of wines that best complement each dish. In making a wine recommendation, the program starts, and in step 60, inquires whether there are more dishes to examine in the preset list of wine dishes. If the answer is yes, the program proceeds to retrieve the product vector of a wine dish. This product vector is preferably stored in the recommendation database 32 (FIG. 2). In step 64, the program computes the vector distance between the wine dish's product vector, and the product vector of a dish that is recommended to the individual. In step 66, the program places the wine dish into a sorted list according to its vector distance. If all the wine dishes in the list have been examined and placed according to their vector distances, the program next selects, in step 68, a wine dish with the smallest vector distance to the dish that is recommended to the user. In step 70, the program retrieves the wine name associated with the selected wine dish. The program, in step 72, then recommends the retrieved wine to the user, as complementing the dish which is recommended.

Figure 9:
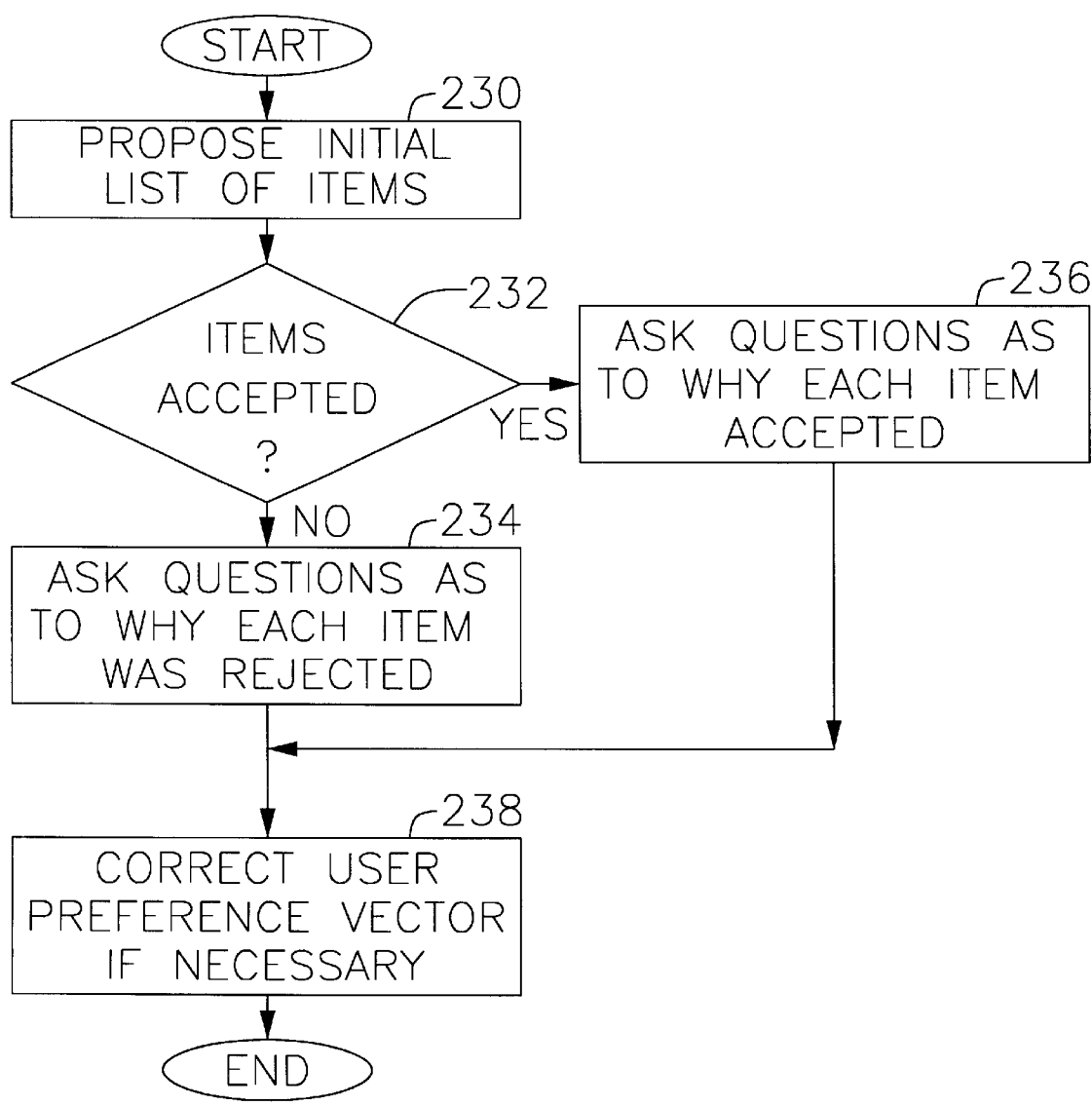
FIG. 9 is an exemplary flow chart of initial steps for learning and adapting to user preferences in accordance with an embodiment of the present invention.

As an individual uses the system over time, the system learns and adapts to the user's preferences. FIG. 9 illustrates the initial learning and adaptation process according to one embodiment of the invention. In step 230, the program proposes an initial list of items to the user. In step 232, the user either accepts or rejects the recommended items. If the items are rejected, the program in step 234 asks feedback questions to ascertain why the items were rejected. Similarly, if the items are accepted, the program in step 236, asks questions to ascertain why each item was accepted. In step 238, the user preference vector 75 is updated, if necessary, and used for future choices. For instance, if a recommended recipe was rejected because it was too spicy, the value in the spiciness field of the user preference vector might be decreased. As a user uses the system over time, the recommendations become more and more accurate and feedback from the user becomes less and less required. In this case, the system may no longer require this type of initial feedback from the user.

Figure 10:
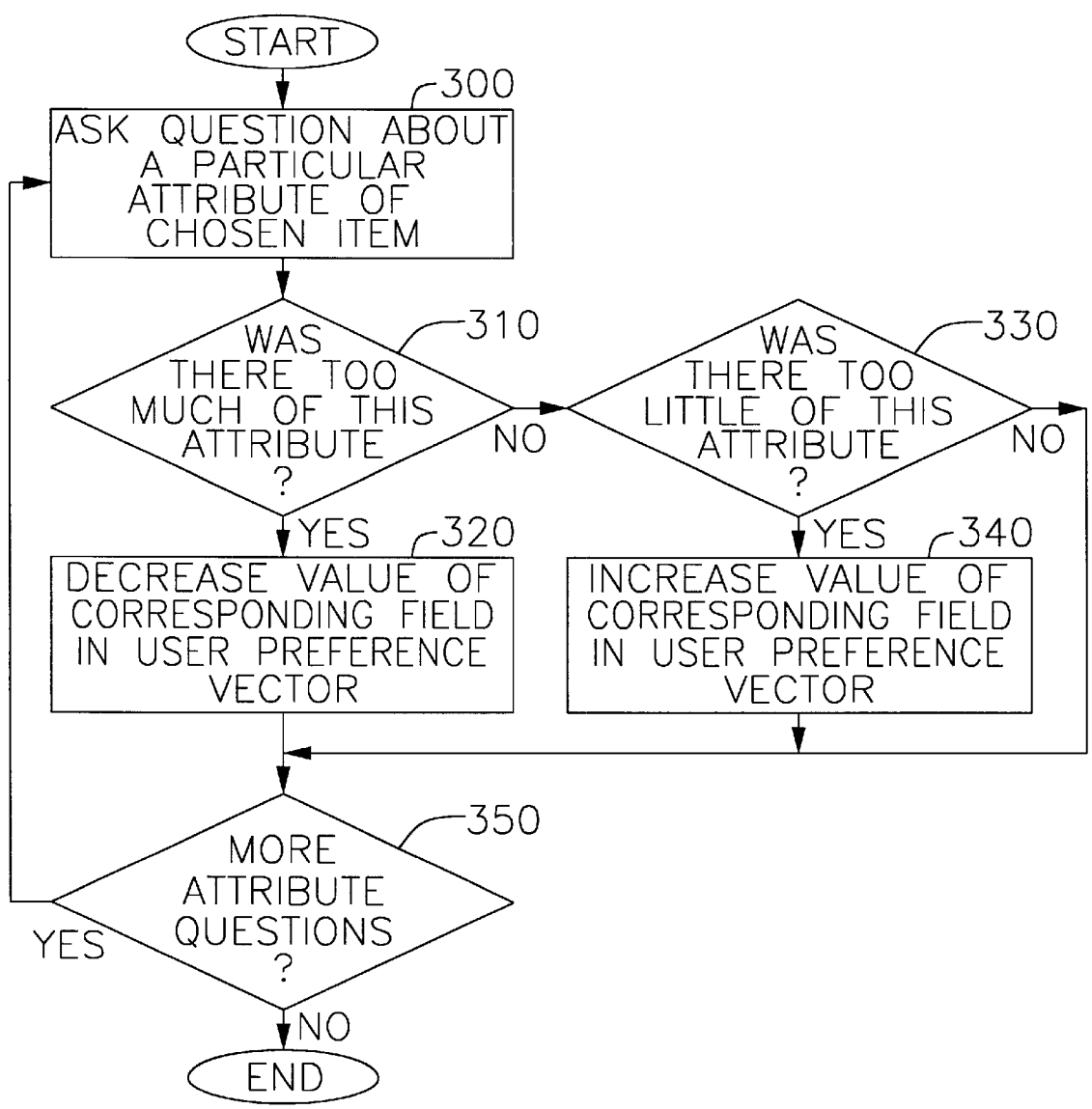
FIG. 10 is an exemplary flow chart of steps for updating a user preference vector based on a sampled item.

FIG. 10 illustrates the process of obtaining feedback from the user for further updating a preference vector after the user has actually sampled a recommended item. The computer program begins and in step 300 asks a question about a particular attribute of the sampled item. Examples of such questions for a system recommending CDs include: "What rating would you give to the recommended CD?"; "What did you like most? Tempo? Instruments? Lyrics?"; and "What did you dislike about the CD?" Examples of questions for a system recommending recipes might include: "What rating would you give to the recommended meal?"; "What did you like most? Taste? Amount of preparation required?"; "Which ingredients did you like or dislike?"; "How should the meal have been changed? Less salty? Lighter?"; and "Was there enough food?"

Based on the user response, the program in step 310 determines whether there was too much of the inquired attribute in the recommended item. If there was, the value in the user's preference vector corresponding to that attribute is decreased in step 320. Likewise, if the program determines in step 320 that there was too little of the inquired attribute in the recommended item, the value in the user's preference vector corresponding to that attribute is increased in step 340. For example, if the songs in a recommended CD were too slow, the value of the field in the user preference vector 75 representing the individual's preference for slow music would be decreased below the value in the corresponding field of the CD's product vector. If a recommended recipe was too salty, the value of the field in the family food preference vector representing the family's preferred saltiness would be decreased below the value in the corresponding field of the recipe product vector.

In an alternative embodiment, a user preference vector modification and/or creation may be done by keeping track of items purchased by a user. According to this embodiment, the system keeps a track of the user's purchase pattern, and creates or updates a preference vector for that user based on such pattern. For instance, if one of the fields in the preference vector represents a user's preference for spicy food, a value may be set for that user based on a study of the user's purchase of items such as chili peppers and hot sauce. This may be accomplished by having a user use a customer card every time he or she visits the store to keep record of the user's purchases. A recommendation system within the store may then make recommendations about items in the store based on the individual's preference vector. Recommendations may be displayed on the customer's shopping cart while he or she is shopping. Alternatively, the store may place the recommendation system at an easily accessible location, such as at the entrance of the store, where a user may get a recommendation prior to shopping.

In addition to updating the user preference vector, ratings of products sampled by the user are used for making recommendations in the future. The system creates a positive cluster vector if a recommended item is given a high rating. For instance, a positive cluster vector might be created for an item if given a rating of 4 or above, in a scale of 0 to 5. The system also creates a negative cluster vector if a recommended item is given a low rating. For instance, a negative cluster vector might be created for an item if it is given a rating of 2 or below. Either cluster vector, when first created, includes the fields and values of the product vector which was given the high or low rating.

The system maintains a maximum number of positive clusters and negative clusters. Thus, in a system where a maximum of five positive clusters is allowed, the system creates a positive cluster vector for the first five items which are given a high rating. If a user gives a high rating to a recommended item after the five positive clusters have been created, the product vector for the new item is merged into one of the existing positive clusters.

According to a preferred embodiment, the system merges a new product vector into an existing cluster by calculating the vector distance to the closest product already belonging to the cluster. The system then selects the cluster with the least vector distance to the new product as the cluster to which the new product is to be merged. During the merging step, the system examines the values stored in vectors already inside the cluster and the new product vector, computes an average value for each vector field, and updates the values in the cluster vector to the computed average values. Thus each cluster contains one or more products with the cluster vector reflecting average values of the products in the cluster.

According to one embodiment of the invention, the user preference vector reflects the average value of each field stored in all the positive clusters. In an alternative embodiment, the system creates a separate average cluster vector for each positive cluster reflecting the average values of all the products in each cluster. During a recommendation process, the system not only uses the user preference vector, but also the average cluster vectors, in making recommendations. For instance, the system may list four items which match the user preference vector, and three items that match an average cluster vector. In this way, the chances that at least some of items recommended, namely, the items recommended based on the average cluster vector, will be to the user's liking.

Order Subsystem

Referring back to FIG. 2, the system's order subsystem 40 allows the system to receive and process on-line purchase requests. According to one embodiment of the invention, a retailer's network server 26 or personal computer 28 hosts an inventory database which is accessible to the order subsystem 40, over the Internet connection 12 (FIG. 1). In its simplest form, the inventory database comprises a record of products, each record identified headed by a UPC code corresponding to a product sold by the retailer. The record further includes the product's name, price, description, and availability information.

Figure 11:
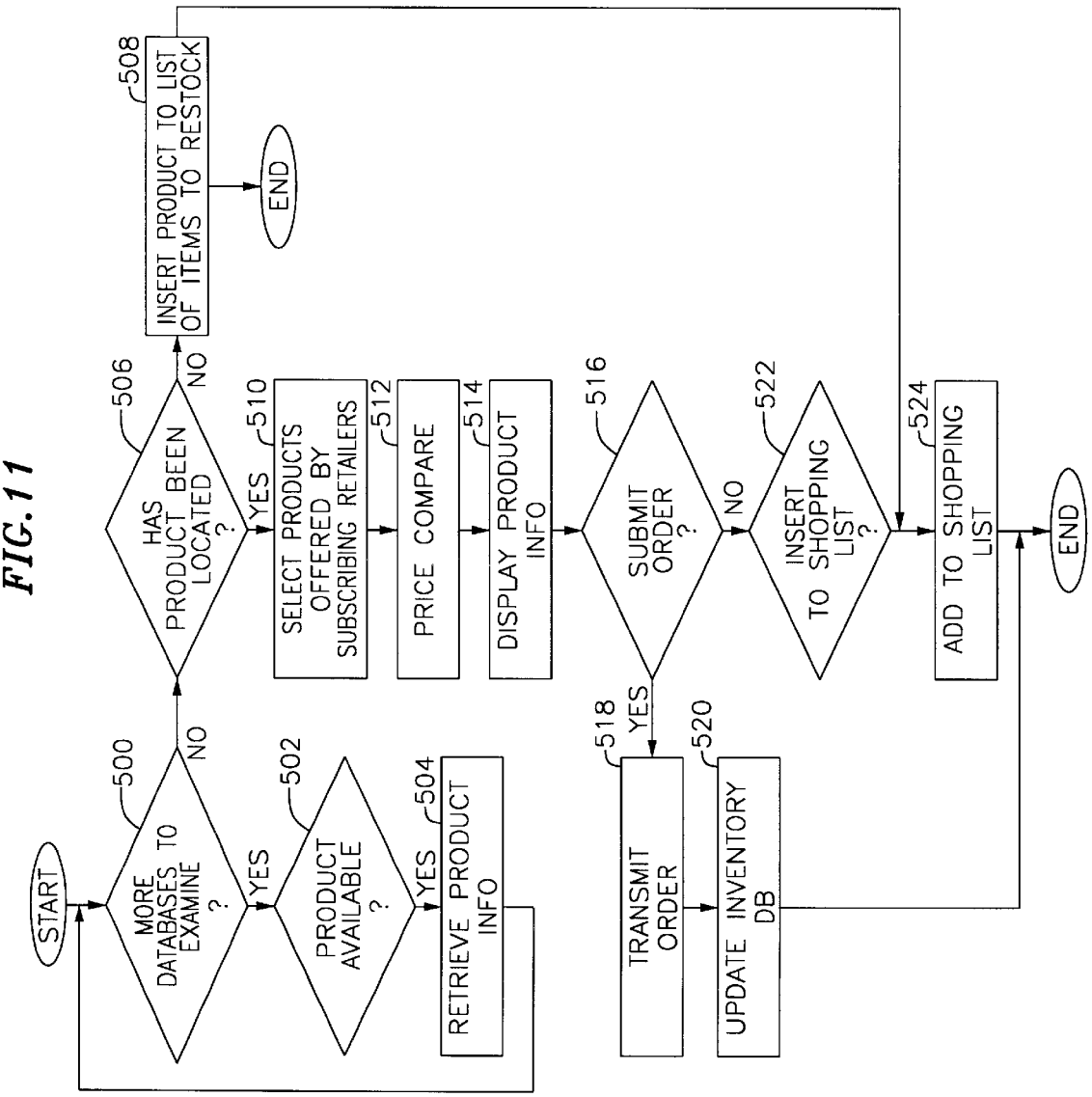
FIG. 11 is an exemplary flow chart of a process undertaken by an order subsystem once a user selects a product which he or she may want to purchase.

FIG. 11 is an exemplary flow diagram illustrating the process undertaken by the order subsystem 40 once a user selects a product which he or she may want to purchase. The computer program starts and inquires in step 500, whether there are any more inventory databases to examine for determining the availability of the product. The program, in step 502, examines the inventory database for availability of the selected product. If the product is found, the program retrieves the product information in step 504.

If all the inventory databases have been examined, the program inquires in step 506 if any products have been located. If the product was not located, the program, in step 508, inserts the product to a list of items to restock.

If the product was found in more than one retailer inventory database, the program, in step. 510, selects the product offered by a sponsor of the system. Furthermore, if, among the sponsor retailers, one retailer offers the product at a cheaper price than the other, the program, in step 512, selects the retailer offering the cheaper product. Alternatively, the program may select a retailer paying the higher sponsorship fee. The retailer and product information in the retailer's inventory database is then displayed in step 514.

In step 516, the program inquires whether the user wants to purchase the product from any of the listed retailers. If the answer is YES, the system, in step 518, transmits a submit order to the selected retailer and updates that retailer's inventory database in step 520 to reflect the purchase. The updating process may be manual or automatic.

If the user is not comfortable in submitting a request over the network, the program inquiries in step 522 whether to insert the item into the user's shopping list. If the answer is YES, the item is inserted in step 524. In doing so, the program inserts the brand name of the item offered by one of the sponsors of the system. The list may be printed by the user for his or her next shopping trip. The item is also inserted into the user's shopping list if the item is not available in the retailer inventory database.

Inventory Control Subsystem

In a recipe recommendation system, the individual user's personal computer 14, set-top box 18, or HPC 20 (FIG. 1) optionally includes an inventory control subsystem which keeps track of ingredients used for meal preparations. According to this embodiment, the personal computer 14, set-top box 18, or HPC hosts a home inventory database storing an inventory table of ingredients available at the user's home. Each entry in the table specifies a UPC code for the ingredient, the amount available, and the expiration date. New items can be automatically or manually added to the database. For instance, every time a grocery item is ordered via the Internet, the inventory control subsystem automatically inserts the item ordered into the inventory table. Alternatively, the update may be made when the goods are actually delivered to the user. In this scenario, the individual uses a bar coder reader to manually scan the UPC code on the goods delivered. The information may also be keyed into the subsystem via the keyboard or touch screen display.

Update to the inventory table is made each time a recommended recipe is selected for cooking. For example, if a recipe calls for two eggs, the subsystem subtracts two from the total number of eggs listed in the inventory table. This method of keeping inventory requires some feedback from the family. For instance, if a user decides to discard a product, he or she should notify the inventory subsystem so that it can be subtracted from the home inventory database. Such notification may be accomplished by scanning the product label via the barcode reader, and keying-in the amount used.

The inventory subsystem further keeps track of validity dates of stored products. If a product is purchased with a pre-marked expiration date, this date is monitored to determine if a product should be discarded or not. If a product does not come with a pre-marked expiration date, the system assigns an expiration date based on the type or category of products. For instance, all leafy vegetables will have one kind of validity date whereas all types of non-leafy vegetables will have a different kind of validity date.

If the validity date or expiration date of the product has passed, the system asks the user if the product should be discarded or kept for an additional number of days. If the product is quickly perishable, such as fish, the system may not allow the user to extend the validity date. If an extension is allowed, the inventory subsystem advises the user as to the types of health risks involved.

The inventory subsystem also performs periodic inventory checks of the products in the home inventory database. The user may select the time period in which to perform the inventory process. During this process, the inventory subsystem lists all of the products that are stored in the home inventory database and asks for confirmation of the amount that is stored for each product. The quantity of each product is then updated.

The inventory subsystem also tries to optimize the amount of food stored in the house. It ensures that only a minimal amount of food is stored. The inventory subsystem will, however, have options to store and monitor food supplies for emergency reasons. For instance, the inventory subsystem can monitor food and water supplies needed for the family in the case of an earthquake.

Setup Subsystem

Figure 12:
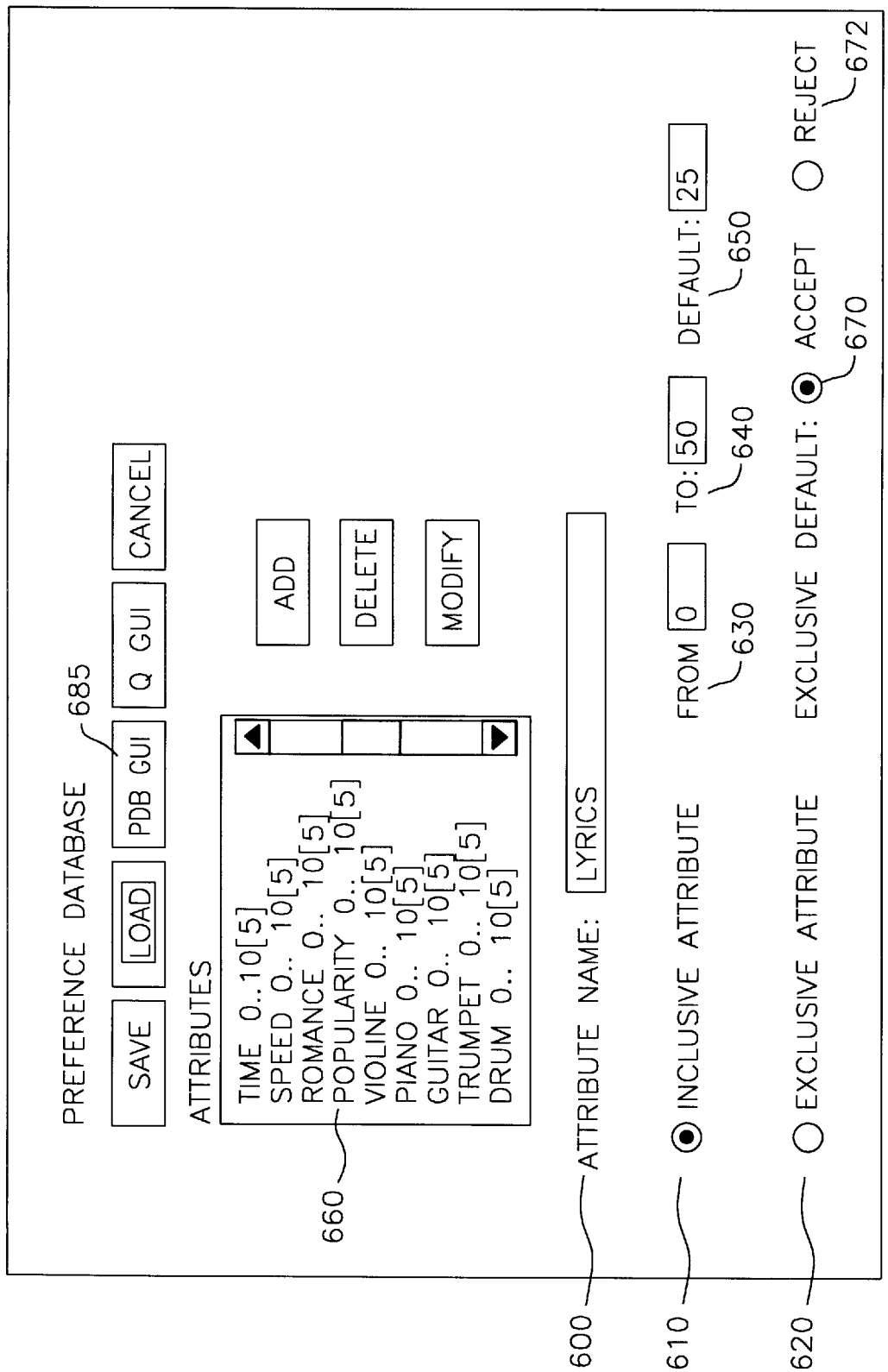
FIG. 12 is an exemplary preferences database GUI for defining attributes.

Referring again to FIG. 2, a setup subsystem 36 in the system's server or platform computer 10 provides a graphics user interface ("GUI") for a system programmer to define or modify vector fields and create preference questions for display to users of the system. FIG. 12 illustrates an exemplary preferences database GUI for allowing the programmer to define attributes 600 and classify them as inclusive 610 or exclusive 620 attributes for a CD recommendation system. Inclusive attributes 610 are used to define the inclusive fields 90 (FIG. 3) of user preference vectors, product vectors, and cluster vectors. Exclusive attributes 620 are used to define the exclusive fields 80 of the vectors.

The system programmer may further set default values for each exclusive or inclusive attribute. For instance, an inclusive attribute may be defined to have a certain range of values with a minimum value defined in a textfield labeled "From" 630 (here, 0) and a maximum value defined in a textfield labeled "To" 640 (here, 50), and a default value defined in a textfield labeled "Default" 650 (here, 25). Other attributes may have other ranges and default values. For instance, the attribute for popularity 660 is defined to have values ranging from 0 to 10, with a default value of 5.

If an attribute 600 to be entered is an exclusive attribute, the programmer selects an exclusive attribute option 620. The entered attribute is set to "1" if the programmer selects the "Accept" option 670. If the programmer selects the "Reject" option, the entered attribute is set to "0".

Once the attributes have been defined, the systems programmer creates a product vector for each product for entry into the recommendation database 32 (FIG. 2). This is done by selecting a "PDB GUI" 685 button. FIG. 13 illustrates an exemplary product database GUI invoked upon selection of the "PDB GUI" button. The product database GUI allows creation of a product vector by entering a product name 700, marking the exclusive preferences 705 that describe the product, and manipulating sliders 710 to set the values of the inclusive preferences. A Product List window 720 lists all the products in the recommendation, database 32. A Distances From Product window 725 displays these products in a sorted list. In the illustrated embodiment, a selection of a product from the product list causes a sorting of the remaining products based on their vector distance to the selected product's vector. The more similar a product is to the selected product, the higher it appears in the Distances From Product window 725. This window may be disabled by selecting an "Enable Distance Window" check box 730.

FIG. 14 illustrates an exemplary question setup GUI for allowing a systems programmer to define the questions to be displayed to a user to initialize a user preference vector. The questions may be created with help of experts in the relevant areas. For instance, questions for setting a user's food preference vector may be created with the help of a dietician.

A systems programmer creates questions relating to inclusive preferences based on the inclusive attributes created with the preferences database GUI of FIG. 12. The inclusive preference questions may be either "fuzzy" or "explicit." Explicit questions solicit a yes/no or numerical answer. Fuzzy questions solicit open-ended answers.

After creation of an inclusive question, a systems programmer selects the attributes 825 to which it relates. For instance, in the illustrated example, the systems programmer creates an inclusive preference question, "How much do you like rock?" 800. After entry of such a question, the systems programmer selects the guitar 805, drum 810, and guitar distortion 800 attributes to which the question relates. The level field 830 in this illustration indicates the maximum value allowed for a selected attribute. For instance, the maximum value for the guitar attribute is "10". Certain attributes will be more important than other attributes. The degree of importance is reflected in this example by a weight field 835.

System programmers also create exclusive questions. Exclusive questions require "yes" or "no" answers from a user as illustrated by the question, "Do you like heavy metal?" 850. Exclusive questions are used to set exclusive preference fields. An exclusive preference will be either included 855 or excluded 860 based on the user's answer to the question.

In addition to creating attributes and questions, the system programmer may further specify where the product vectors and user preference vectors are stored. These may be stored in the system's database or in an offsite database.

Alternative Recipe Recommendation System

Figure 15:
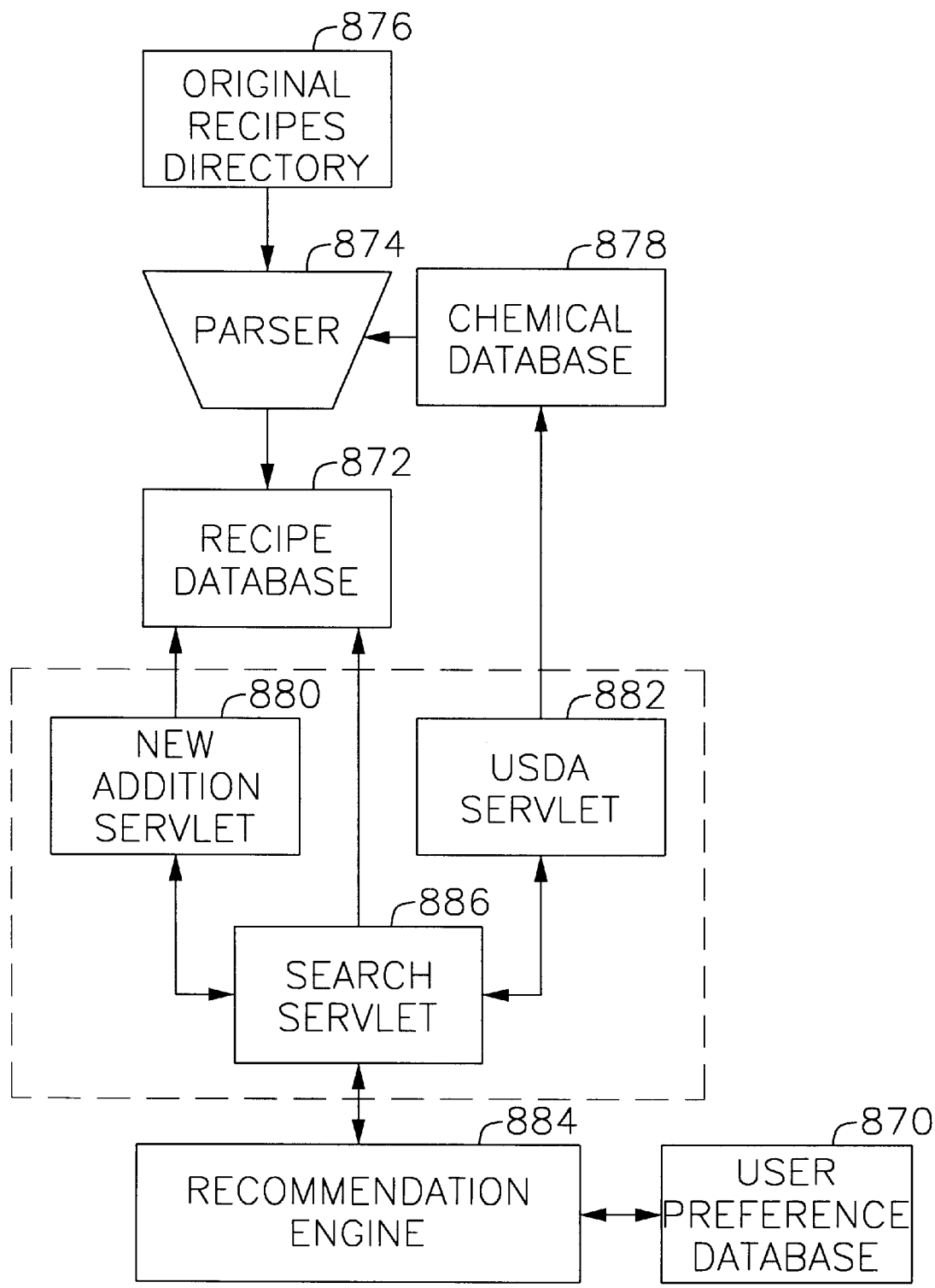
FIG. 15 is a block diagram of a configuration of an alternative network server or platform computer of FIGS. 1 and 2.
Figure 16:
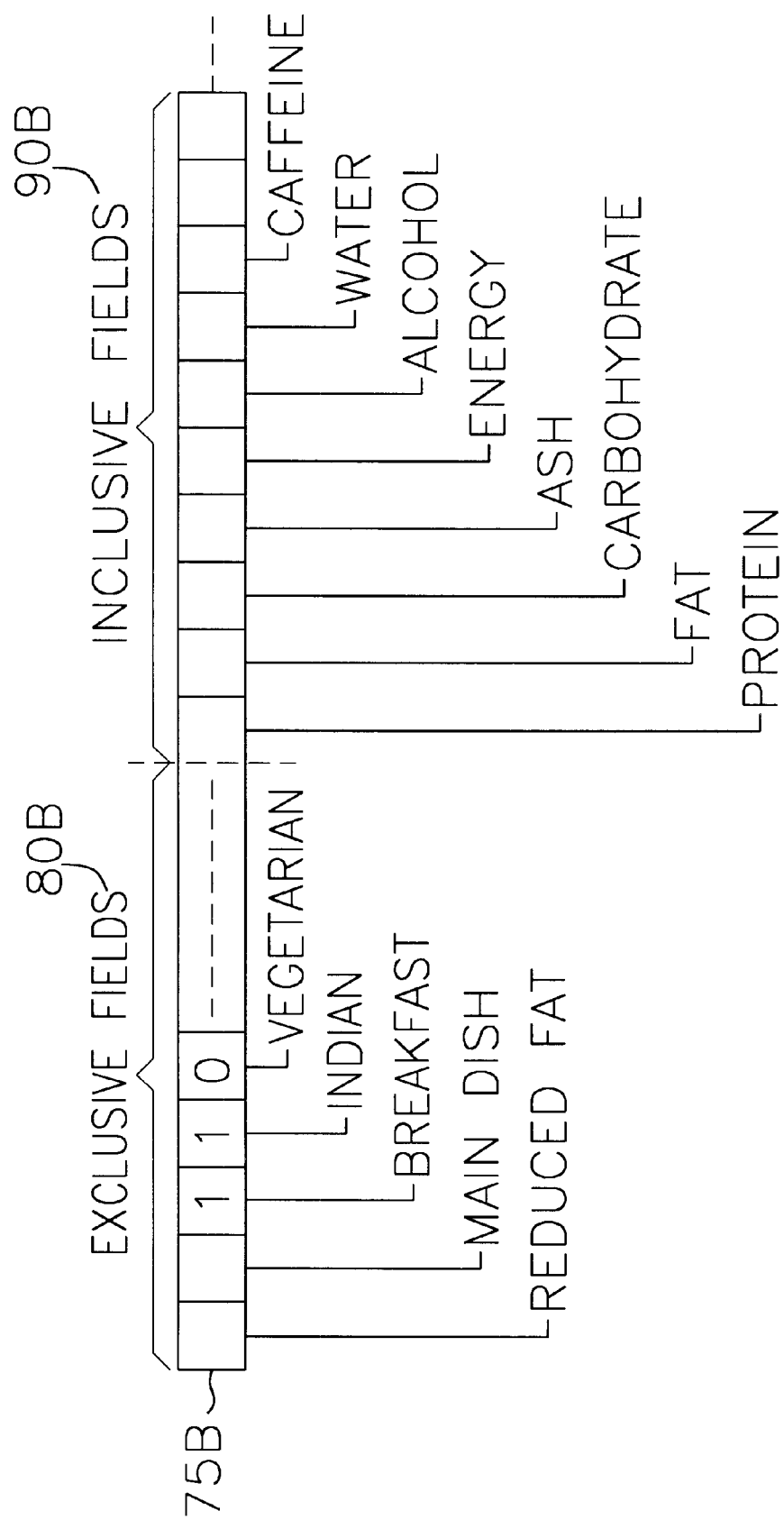
FIG. 16 is an alternative embodiment for storing user food preferences in a user preference vector.

FIG. 15 is a block diagram of a configuration of an alternative network server or platform computer 10 of FIGS. 1 and 2, for specifically recommending recipes. According to the illustrated embodiment, the system hosts a user preference database 870 storing user preference vectors that map the food tastes of the individual users of the system. FIG. 16 illustrates an exemplary individual's food preference vector 75B. The vector is divided into exclusive fields 80B and inclusive fields 90B. The exclusive fields 90A depict specific categories of foods to exclude in making a recommendation.

Inclusive fields 90B indicate a user's degree of preference with respect to a particular attribute. According to a currently preferred embodiment, the inclusive fields correspond to chemical components that may be contained in a dish. Each chemical component or combination of chemical components creates a particular type of taste (e.g. saltiness, bitterness, etc.) A value is assigned to the various chemical components based on the user's preference to such chemicals. The system determines the user's tastes by requesting a user to specify one or more of his or her favorite foods. The system then analyzes the chemical components in the specified foods, and assigns values to the inclusive fields 90B, as is described in further detail below.

Referring back to FIG. 15, a recipe database 872 stores a recipe vector for each dish capable of being recommended by the system. Each recipe vector is identified by the name of the dish. According to one embodiment of the invention, the recipe vector includes the same exclusive fields and inclusive fields as a user's food preference vector 75B (FIG. 16). Thus, a recipe vector will have the appropriate exclusive fields set based on the food category it belongs, and the appropriate inclusive fields set based on the amount of chemical components contained in the recipe.

In an alternative embodiment, the recipe vector includes only the inclusive fields depicting the chemical components of the dish. According to this embodiment, the recipe vectors are stored under appropriate categories based on the type of dish being represented. Each category is associated with an exclusive field of a user's food preference vector. Thus, a recipe vector for a vegetarian dish is stored under a Vegetarian category while a recipe vector for a Breakfast dish is stored under a Breakfast category. Furthermore, a single recipe vector may belong to multiple categories.

Recipe vectors are created with the aid of a parser 874 which is in communication with an original recipes directory 876 and a chemical database 878. The parser 874 takes a recipe in the original recipes directory 876, parses out the ingredients in the recipe, and maps the ingredients to the chemicals in the chemical database 878, as is discussed in further detail below. A parsed recipe may be modified via a menu addition servlet 880. The servlet, moreover, allows recipes to be entered directly into the recipe database 872 without invoking the parser.

The chemical database might be organized into a series of records, each record being specific to a particular food item/ingredient. Each record is headed and identified by the name of the food item/ingredient, and includes a list of all the chemical components that may be found in any type of food. FIGS. 26A–26D illustrate a list of chemical components included in each record according to a currently preferred embodiment. Associated with each chemical component is a value reflective of the amount present in a base unit of the corresponding food item/ingredient. For example, a food item identified as an "egg, whole, raw, fresh", may have a base unit of 1 medium egg. The record for this food item would then list the amount of each chemical component for 1 medium egg.

Figure 17:
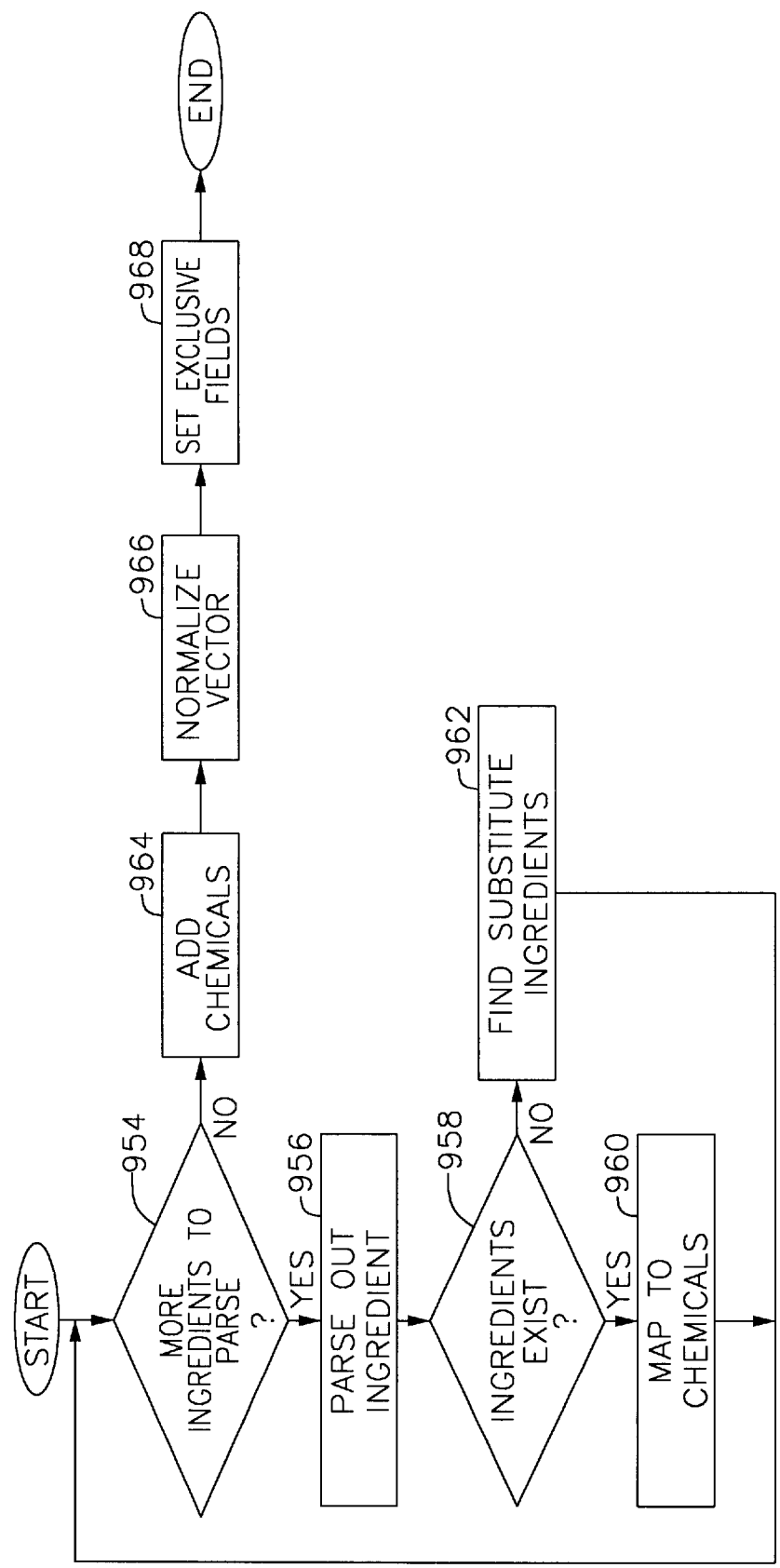
FIG. 17 is an exemplary flow chart of a process for parsing and creating recipe vectors according to one embodiment of the present invention.

FIG. 17 is a flow diagram of an exemplary parsing and recipe vector creation process according to one embodiment of the invention. The computer program starts by taking an original recipe from the original recipes directory 876, and in step 954, inquires whether there are any more ingredients to parse. If the answer is yes, the program parses out an ingredient in step 956. The program also asks in step 958 whether the parsed ingredient exists in the chemical database 878. If it does, the system maps the chemical compositions making up the ingredient to an ingredient vector. In doing so, the system searches the chemical database for a record corresponding to the ingredient. If the record is found, the system sets the values of the ingredient vector according to the chemical values stored in the located record. The system then multiplies the values in the ingredient vector with the weight/amount of the ingredient called for in the recipe. In addition, the system might multiply each field in the ingredient vector by the weight (scaling coefficient) assigned to the field. Chemical compositions which make greater contributions to an ingredient's taste and attribute are given higher weights than those that do not have much effect on neither taste nor attribute. For instance proteins and sugars are given a maximum possible weight (e.g. 100 in a scale of 0–100), while energy and calcium are given low weights (e.g. 0.1 in a scale of 0–100).

If the program does not find an ingredient in the chemical database, a substitute ingredient that is found in the database is used in its place. The substitution may be done manually by a systems programmer via the menu addition servlet 880. Alternatively, the system might select a key phrase in the ingredient's name, and find an ingredient in the recipe database that includes the selected key phrase.

After all the ingredients of the given recipe have been parsed, the computer program, in step 964, adds the chemicals found in the various ingredients by performing a vector addition of all the ingredient vectors. The resultant vector is saved as a recipe vector, and in step 966, is normalized for hundred grams of the entire recipe. In step 968, the exclusive fields of the recipe vector are set via a systems programmer, and the process ends.

The system also hosts a USDA servlet 882 which allows addition of ingredients and their corresponding chemical compositions, into the chemical database 878. Thus, if an ingredient in a recipe being parsed is not found in the chemical database, the ingredient and its chemical composition may be added to the database. Alternatively, the closest match to the ingredient missing from the database may be used to map the chemicals.

A recommendation engine 884 in conjunction with a search servlet acts to find recipes that will cater to an individual's tastes. According to a currently preferred embodiment, the recommendation engine computes the vector distance between the user's food preference vector and each recipe vector to find the dishes to recommend.

FIGS. 18–28 are layouts of exemplary graphic user interfaces provided by the recommendation system. FIG. 18 is an exemplary user registration GUI. A user must provide an e-mail address and a fax number if he or she wants to receive recommendation information via e-mail or fax. The user further selects a username and a password to access the system. The user also provides other identification information, such as the user name, address, and telephone number, as part of his registration process. The user's address is used by the system to recommend restaurants in the user's geographic area.

FIG. 19 is an exemplary GUI for allowing entry of preference information from the user for initializing the user's food preference vector. The user may use the GUI to enter his or her favorite dish 900, and select a find dishes button 902. If the name of the dish exists in the recipe database, the dish typed-in by the user is accepted. Otherwise, if the system cannot find an exact match, the system displays a list of other comparable dishes for user selection. In its most general form, this is accomplished by finding dishes with names that partly match the dish name specified by the user. For instance, the user may type-in "Spaghetti" as his or her favorite dish. If the recipe database 872 (FIG. 15) does not contain a dish simply called "Spaghetti" but does contain dishes with the word "Spaghetti" such as "Spaghetti and meatballs", "Seafood spaghetti", and "Spaghetti and white clam sauce", the list of such dishes are displayed to the user for his or her selection.

The system further allows the user to rate up to five other dishes that the user likes 904 to get better knowledge of the user's tastes. The user accesses a list of dishes stored in the recipes database 872 by selecting a down-arrow button 906, and further selecting a dish from a resultant pull-down menu of dishes.

The system also inquires whether the user is on a particular type of diet 908, or whether the user is allergic to particular types of foods 910. The user-responses are then used for setting the exclusive fields in the user's exclusive preference vector.

Upon the completion of the form illustrated in FIG. 19, the user selects a "Submit ratings" button, and submits the responses to the system's network server or platform computer 10 (FIG. 1). The system then proceeds to create and/or update the user's food preference vector. If the user has entered a favorite dish 900, the system retrieves the recipe vector for the particular dish, and copies the values of the recipe's inclusive fields, into the inclusive fields of the user's preference vector. The exclusive fields are set according to the responses to questions posed by the system regarding to the user's diet 906 and allergies 908.

According to a currently preferred embodiment, the system creates food preference vectors for the other five dishes the user has rated to be to his or her liking 904. Each preference vector acts as a cluster vector. As the user uses the system and indicates other dishes to be his or her favorite, the recipe vectors for those dishes are merged into a cluster with a smallest vector distance to the new favorite dish. Cluster vectors and various alternatives in creating cluster vectors is discussed above in greater detail.

Figure 20:
FIG. 20 is an exemplary group setup GUI in accordance with one embodiment of the present invention.

After one or more preference vectors have been created, the system may now make recommendations on recipes that will cater to the individual's tastes. In addition, the system may also make recommendations that cater to a group of individuals who have registered into the system. FIG. 20 is an exemplary group setup GUI. In accordance with one embodiment of the invention, the user may create a new group, or add himself or herself to an existing group, by selecting a group setup option 912. When a user first registers onto the system, a new group is created with the individual as the initial member and creator of the group. A creator of the group is given special privileges, such as the ability to delete the group, and add or delete members to the group.

In making a recommendation for a group, the system selects a recipe in the recipe database and computes the vector distance to the nearest product cluster of each member in the group. The average distance to the recipe is then calculated by adding the vector distances to the recipe for all the members, and dividing the total distance by the number of members in the group. This is done for each recipe in the recipe database. The system then recommends the recipe with the smallest average vector distance.

Figure 21:
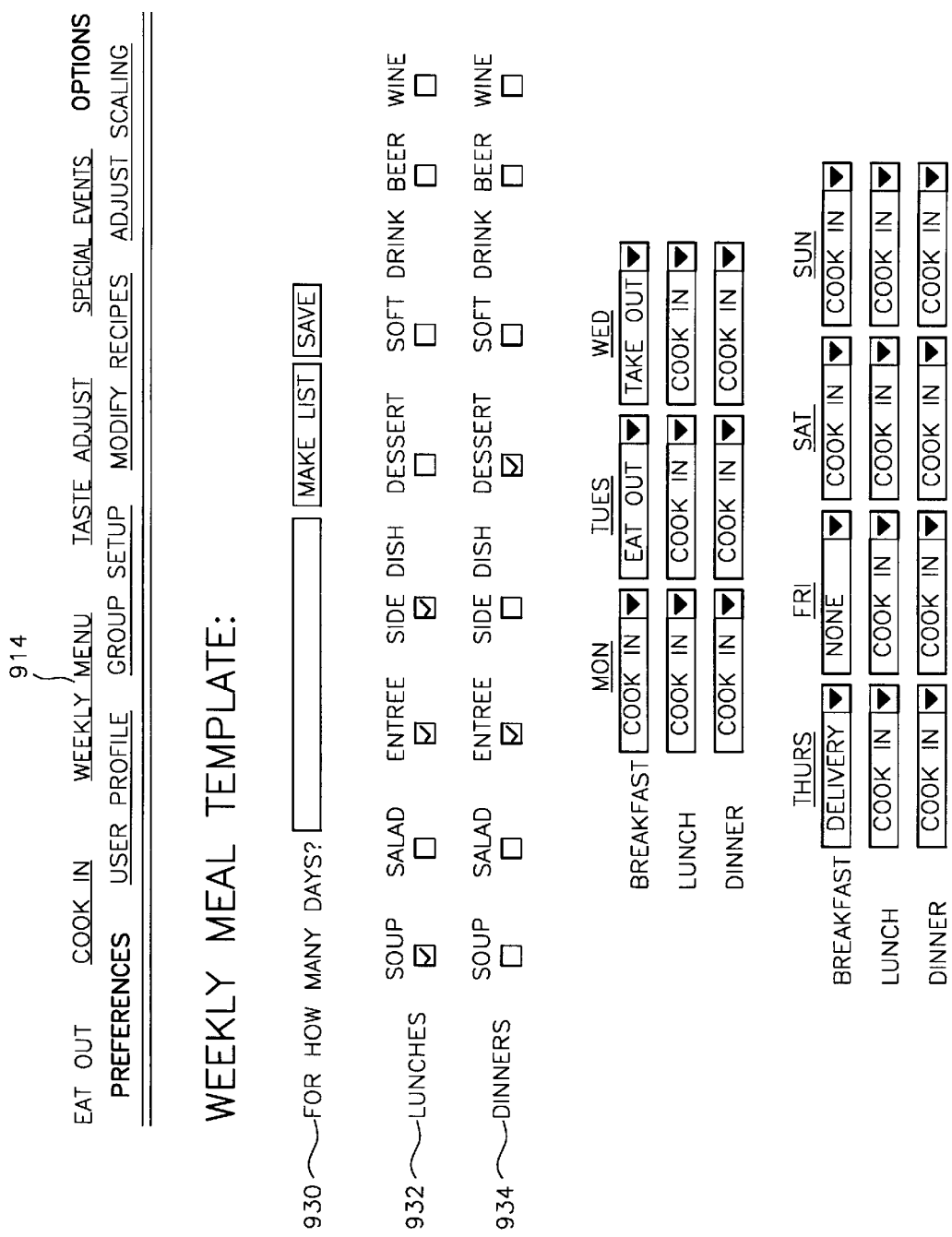
FIG. 21 is an exemplary GUI for allowing meal template setups according to one embodiment of the present invention.

FIG. 21 is an exemplary GUI for allowing a user to set a meal template for a specified number of days 930. For instance, the user can request that a soup, salad, entree, side dish, dessert, soft drink, beer, and/or wine be recommended for all lunches 932 or dinners 934. The user can also specify, for each day of the week, whether the user will be cooking in, eating out, doing take out, or requesting delivery.

Figure 22:
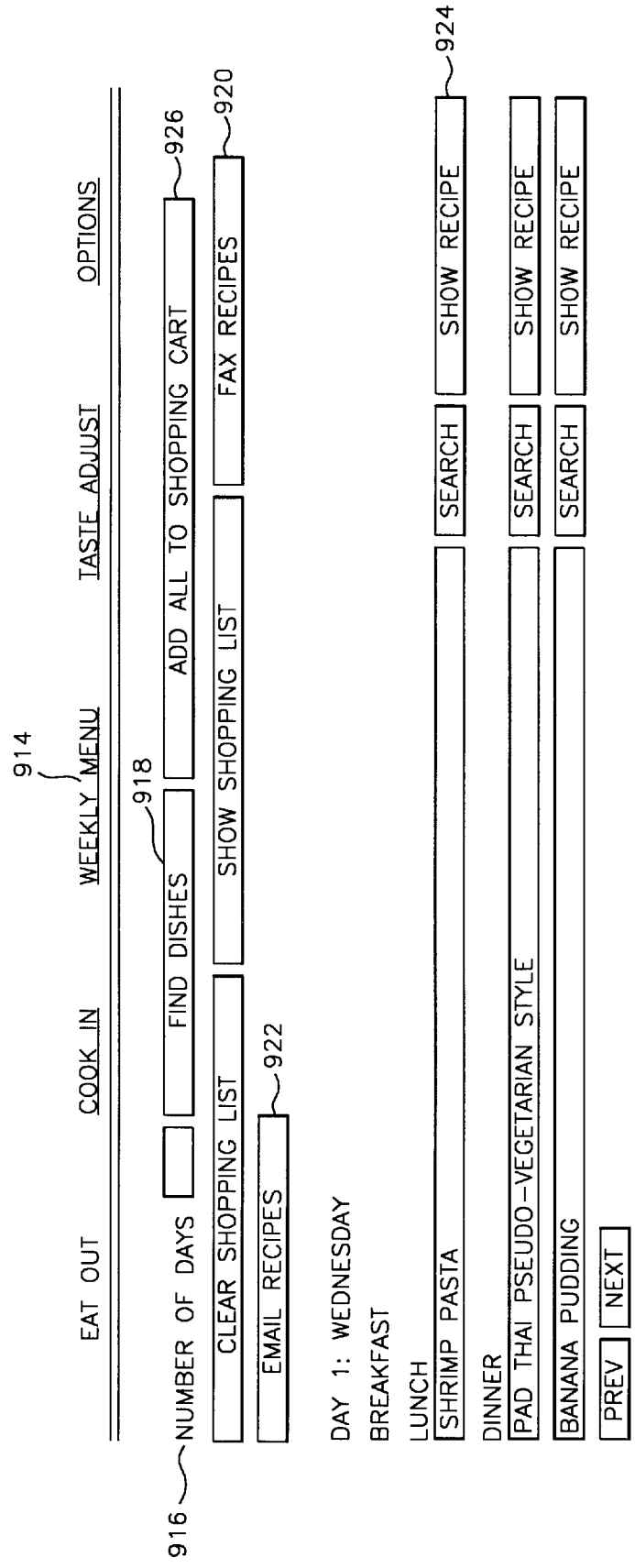
FIG. 22 is an exemplary GUI for displaying a weekly menu according to one embodiment of the present invention.

A user may view his or her weekly menu by selecting a weekly menu option 914, as illustrated in FIG. 22. The user may also view recommendations for a different number of days (e.g. the next two weeks) by entering a desired number in a "Number of days" 916 field, and selecting a "find dishes" button 924. For a day specified as a cook-in day, the system displays recommendations of specified type of dishes (e.g. soup, salad, entree, etc.). A "Show Recipe" button 924 next to the recommended dish allows the user to view a picture of the prepared dish, the dish ingredients, and preparation instructions.

Figure 23:
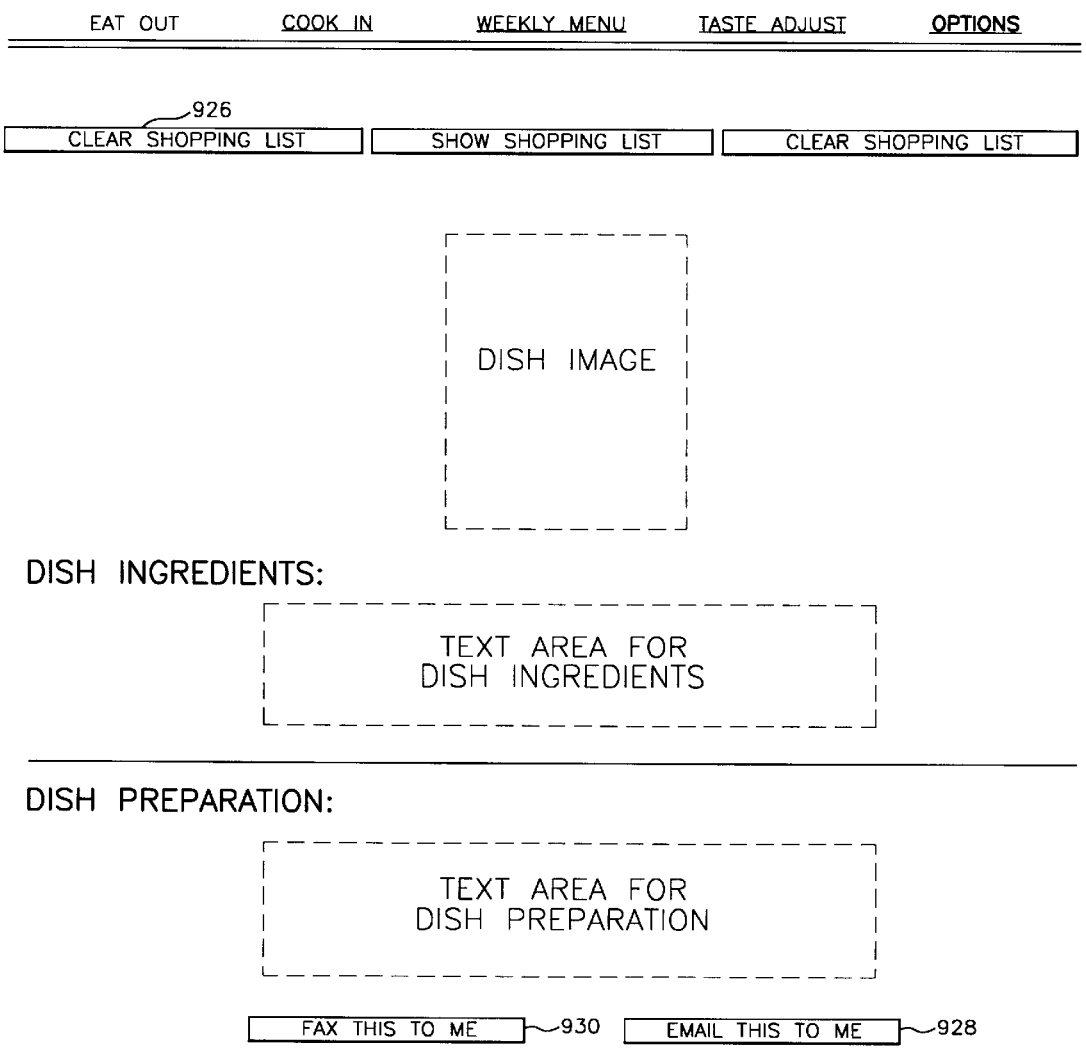
FIG. 23 is an illustration of an exemplary recipe recommended by the system.

FIG. 23 illustrates an exemplary recipe displayed upon selection of the "Show Recipe" button 924. The ingredients necessary may be added to a shopping list by selecting an "Add to Shopping List" button 926. Furthermore, the recipe may be e-mailed 928 and/or faxed 930 to the user, if so desired. According to one embodiment of the invention, multimedia presentations are used in conjunction with the written instructions to instruct a family member in how to prepare the recommended dish. The multimedia presentation will typically include a video/audio presentation. In other cases, references to cookbooks will be made for the user to look up the instructions in a specified cookbook.

For a day specified as an eat-out, take-out, or delivery day, the system recommends a restaurant along with dishes which cater to the user's tastes. In doing so, the system accesses a restaurant database including a list of restaurants in the user's geographical area. Alternatively, the restaurant database includes a list of restaurants registered with the system.

Figure 24:
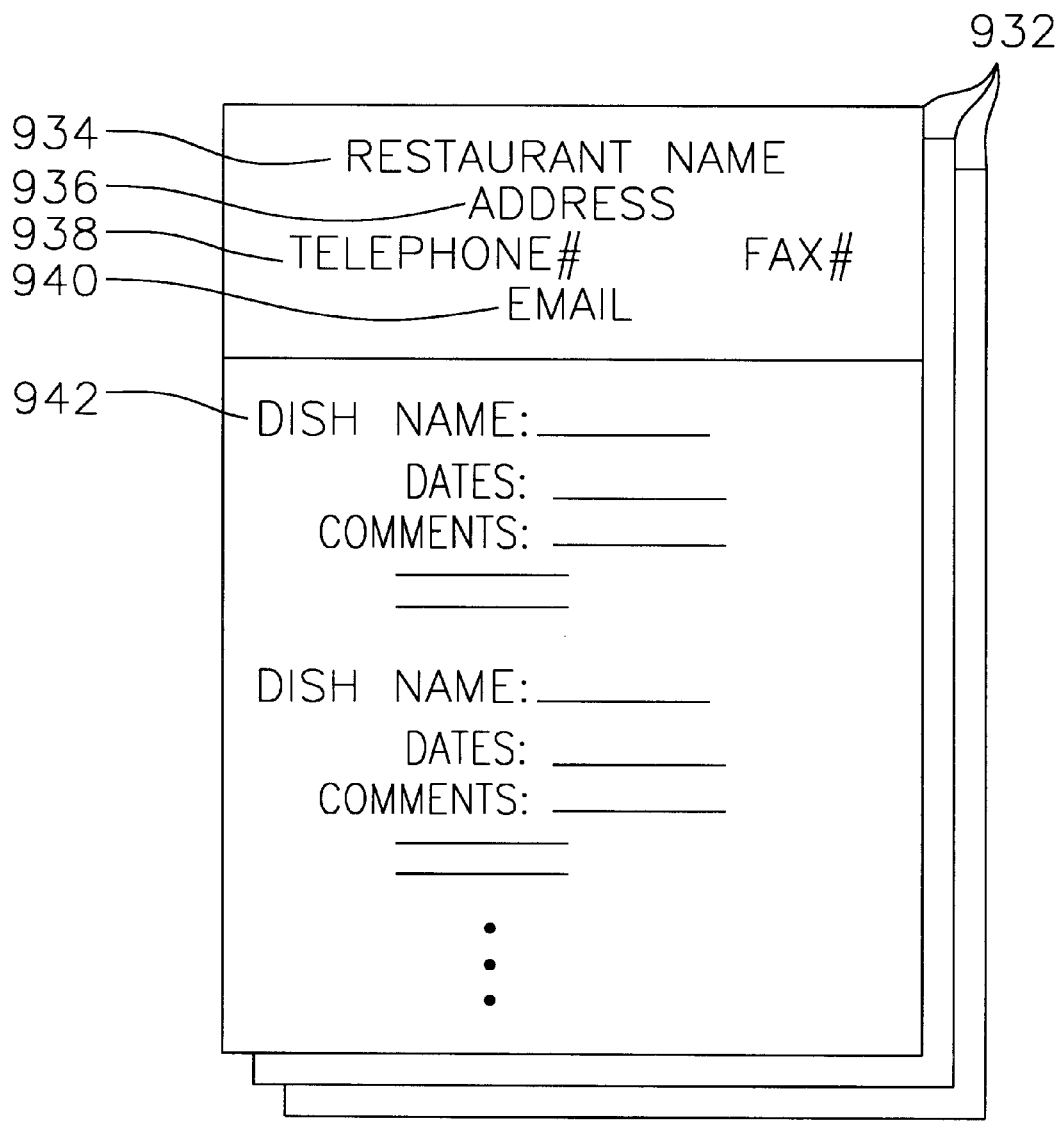
FIG. 24 is a diagram of a layout of an exemplary restaurant database according to one embodiment of the present invention.

FIG. 24 is a diagram of a layout of an exemplary restaurant database. The restaurant database comprises a series of restaurant specific records (identified generally at 932) each of which is headed and identified by a restaurant name 934. Following the restaurant name, each restaurant's data record includes the address 936 of the restaurant, including it's e-mail address 940, and the restaurant's telephone and fax numbers 938. The record might further indicate whether the restaurant delivers, allows take-outs, or receives orders via the Internet or fax.

Each restaurant record 932 also includes an information storage area with a list of dishes 942 offered by the restaurant. In a currently preferred embodiment, each dish is associated with a recipe vector in the recipe database 872 (FIG. 15). Associated with each listed dish 942 are the dates 944 in which the dish is offered. For example, the dish may be offered everyday, or on certain days of the week (e.g. Sundays). The dish may also be offered for a limited period of time (e.g. June 1–June 28). Also associated with each dish are comments 946 related to the dish, if such was provided by the restaurant.

In recommending a restaurant to a user, the system analyzes the dishes offered by each restaurant, and computes the vector distance between the user's food preference vector and a restaurant's recipe vector. The restaurant with a dish with the smallest vector distance is then recommended.

If a restaurant is to be recommended to a group of individuals, the system calculates the vector distance to the dishes of a particular restaurant, and calculates the average vector distance for that restaurant. A restaurant with the smallest average vector distance is then selected for recommendation. Alternatively, each member of the group might be requested to select a menu item from any of the restaurants in the restaurant database. The system then analyzes the recipe vectors of the chosen items, and selects a restaurant that best satisfies the menu items selected. If a particular menu item is not located in the selected restaurant's record 932, the system finds the closest substitute menu item and proposes it to the individual whose menu item was not located. The individual may accept the recommended item, or select a different item from the selected restaurant's menu. The system may further add the various menu items (e.g. 6 cheeseburgers, 2 fries, 5 cokes), and transmit the order via the Internet, fax, or other known communication means.

Referring back to FIG. 22, a user may request that the recommendations made for the entire week, whether it be a particular dish and/or restaurant recommendation, be e-mailed and/or faxed to the user. The user makes these requests by selecting a "fax recipes" button 920 or an "email recipes" button 922, respectively. Alternatively, the system automatically e-mails or faxes the recommendations for the week, at the beginning of each week. In this way, the user need not revisit the system to get the recommendations once he or she is registered.

In addition, an "Add all to Shopping Cart" option 920 causes the system to prepare a shopping list of all ingredients necessary for preparing the cook-in meals for the week (or an otherwise specified number of days). In doing so, the system adds the recommended quantities of ingredients required in more than one recipe, rather than listing the same ingredient in multiple locations of the list. For example, if the recipes recommended for day one and day three both require a cup of sugar, the system places two cups of sugar into the shopping list instead of placing a cup of sugar in two separate listings. Furthermore, the system determines whether an ingredient is offered by one of the sponsors of the system. If this is the case, the sponsor's brand name is suggested for the ingredient. For instance, if one of the ingredients to be inserted into the shopping list is cream cheese, and one of the sponsors of the system is Kraft Foods, Inc., the system would place Philadelphia® cream cheese into the user's shopping list. If the system has access to an inventory database, as is described in further detail above, the system places an ingredient into the shopping list if the user is running low on the ingredient.

The system further allows a user to search for dishes which taste similar to a dish entered. A user does so by entering a dish and selecting a "Search" button 925. The system then searches the recipe database 872 and displays a list of dishes with the smallest vector distance. A user may similarly find dishes which include specified types of ingredients or find dishes that exclude specified types of ingredients.

FIG. 25 is an exemplary GUI for receiving feedback from a user in regards to a recommended recipe. The user gives a rating 950 to each recommended dish 948 if it has been sampled by the user. For instance, if the user really liked a sampled dish, he or she may give it a rating of "8". On the other hand, if he or she just tolerated a dish, a rating of "3" is given. The ratings are submitted by selecting a "Submit" button 952.

The system utilizes the feedback received from the user to modify his or her food preference vector. According to one embodiment of the invention, a highly rated dish (e.g. dishes with rating of "7" or above) is merged into an existing cluster, as is described in further detail above. The ratings of the dishes are used to modify the values of the inclusive fields of the user's food preference vector. The amount by which a value is modified is proportional to the degree of dislike expressed by the user. For instance, if the protein field in the user's preference vector has a value of 30 (a value that is below average on a scale of 0 to 100), and the user gives a rating of "1" to a sampled dish, expressing a great dislike to the dish, the system might modify the protein field to a value of 90 (a value that is above average). This is done for every inclusive field in the user's preference vector. On the other hand, if the user only slightly disliked a dish, the inclusive field values may be modified only slightly, such as modifying the protein field to a value of 35. For the lowly rated dishes (e.g. dishes with ratings of "2" or below) the system further creates negative cluster vectors to ensure that these dishes, or similar dishes, are not recommended in the future.

FIGS. 26A–26D are exemplary GUIs for adjusting the weights (scaling coefficients) 960 of the chemical compositions 962 appearing in the inclusive fields of a recipe vector or a user preference vector. The weights 960 are preferably set based on the contribution of each chemical composition to a dish's taste or attribute. In creating a recipe vector for a particular dish, the system multiplies the weight of a chemical composition with the amount of the chemical present in the dish. Thus, if a dish contains six grams of protein, and the protein attribute is given a weight of 100, the value in the protein field before normalization would be 600 (6×100). An individual user of the system or a systems programer may increase or decrease the weight factors by selecting a "+" icon or a "−" icon, respectively. Furthermore, a user may view the amount of each chemical composition 964 in a particular dish, by entering the name of a desired dish 966 found in the recipe database. If the user enters a name of a second dish 968, the system displays the chemical compositions in the second dish, as well as the vector distance 970 between the first dish 966 and the second dish 968.

Figure 27:
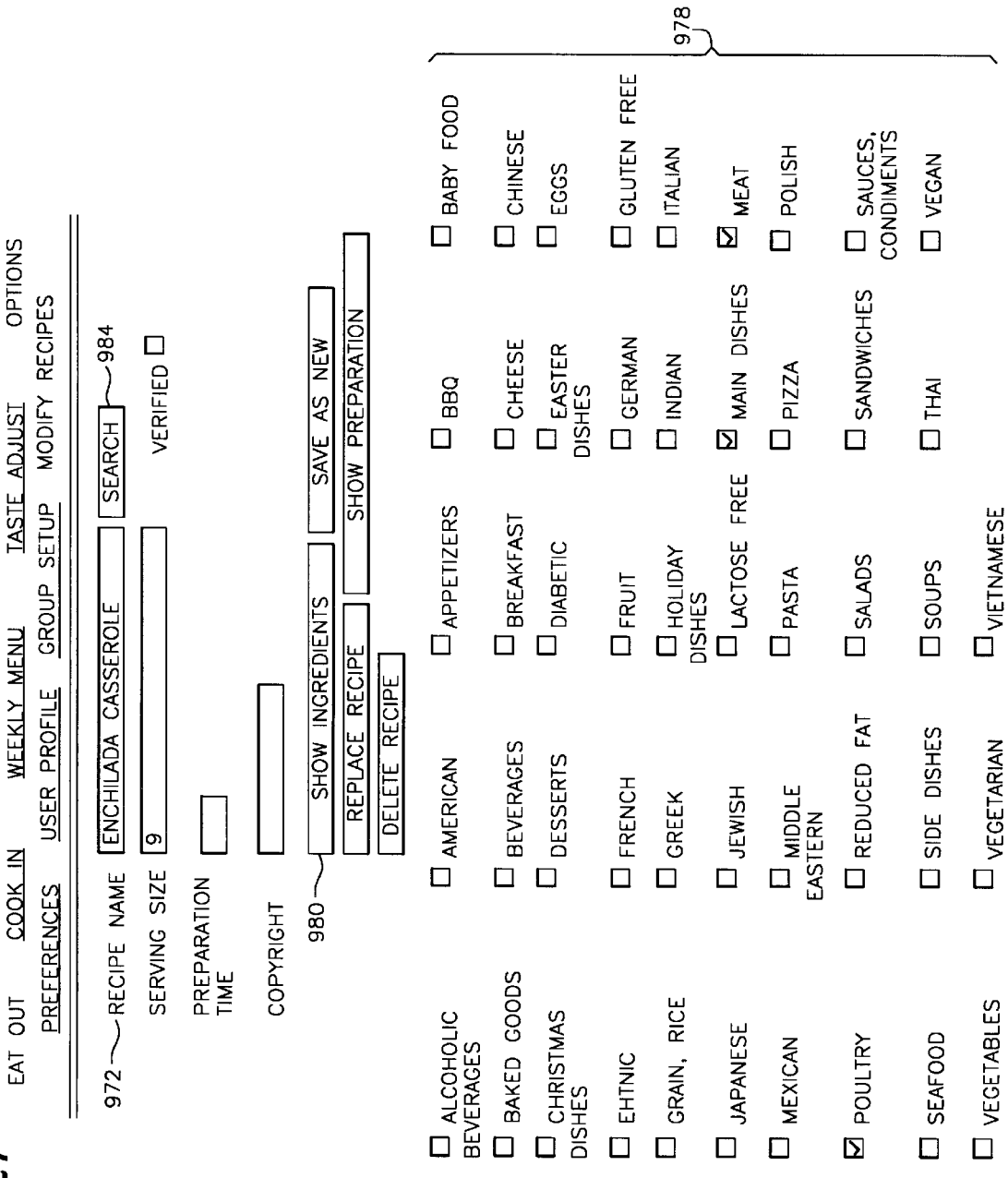
FIG. 27 is an exemplary GUI for the menu addition servlet of FIG. 15.

FIG. 27 is an exemplary GUI for the menu addition servlet 880 of FIG. 15. The GUI is available to a systems programmer for modifying recipes and recipe vectors, as well as adding new recipes directly into the recipe database 872. The systems programmer enters a new recipe by entering a recipe name 972, serving size 974, and preparation time 976 for the recipe. The programmer then selects the exclusive categories 978 to which the recipe belongs, and sets the exclusive fields of the corresponding recipe vector.

A "Show Ingredients" button 980 allows the programmer to enter the ingredients for the new recipe. FIG. 28 is an exemplary GUI for entering ingredients upon selection of the "Show Ingredients" button 980. After entry of the ingredients, the user selects a "Map" button 982 for mapping the ingredients to chemicals in the chemical database 878 (FIG. 15), and setting the inclusive fields of the corresponding vector.

If the systems programmer desires to modify an existing recipe, he or she enters the desired recipe name 972 and selects a "Search" button 984. The programmer may then make modifications to the exclusive categories 978, or add/modify ingredients by selecting the "Show Ingredients" button 980. The modified recipe is then re-mapped by selecting the "Map" button 982 of FIG. 28.

While the invention has been described with respect to particular illustrated embodiments, those skilled in the art and technology to which the invention pertains will have no difficulty devising variations which in no way depart from the invention. For instance, the exclusive and inclusive fields may be maintained as separate vectors. Furthermore, the method of automating the creation of recipe vectors may be extended to automate the creation of other product vectors. For example, in creating product vectors for musical pieces, analysis of the musical pieces may be performed via an automated DSP (digital signal processing) algorithm. This would allow the automatic detection of the kinds of instruments involved as well as other musical attributes necessary to create the product vectors. For a painting recommendation system, color and texture analysis may be correlated to attributes present in paintings to automatically create a product vector for a particular painting. Furthermore, the described system for recommending items may be extended to other types of knowledge-based selection systems where recommendations are made based on the knowledge of a user's preference. Accordingly, the present invention is not limited to the specific embodiments described above, but rather as defined by the scope of the appended claims and their equivalents.

What is claimed is:

1. A computer-implemented method for recommending recipes catered to a particular user's preferences, the method comprising:

creating a user preference vector having a plurality of fields, each field corresponding to a chemical component contained in food;

obtaining a user preference for a particular type of dish;

analyzing the chemical components contained in the dish;

assigning values to the fields of the user preference vector corresponding to the chemical components contained in the dish, the values being based on an amount of each chemical component present in the dish;

retrieving a recipe from a menu recommendation database;

comparing the recipe with the user preference vector; and selecting the recipe as a recommended recipe.

2. The method of claim 1 further comprising creating a recipe vector for the recipe, the recipe vector having a plurality of fields, the fields of the recipe vector corresponding to the fields of the user preference vector.

3. The method of claim 2, wherein the comparing includes calculating a vector distance between the user preference vector and the recipe vector.

4. The method of claim 2, wherein the creating the recipe vector further comprises:

parsing the recipe for ingredients contained in the recipe;

searching for the ingredients in a chemical database;

retrieving chemical components found in each of the ingredients; and assigning values to the fields of the recipe vector corresponding to the retrieved chemical components, the values being based on a total amount of each retrieved chemical component.

5. The method of claim 1 further comprising:

obtaining user feedback about the recommended recipe; and modifying the value of at least one of the fields of the user preference vector based on the user feedback.

6. The method of claim 5, wherein the obtaining user feedback further comprises obtaining a user rating for the recommended recipe, and the modifying the value further comprises:

analyzing the chemical components contained in the recipe;

locating the fields of the user preference vector corresponding to the chemical components contained in the recipe; and changing the values of the retrieved fields, the change of value being proportional to the rating provided by the user.

7. The method of claim 1, wherein each field is assigned a weight, the weight being dependent on contributions of the chemical composition corresponding to each field to the food's taste or attribute.

8. The method of claim 1 further comprising:

maintaining a list of products offered by a particular vendor in a retailer inventory database;

parsing the recommend recipe for specific ingredients;

searching the retailer inventory database for the specific ingredients; and inserting matching products offered by the particular vendor into a shopping list.

9. The method of claim 1, wherein each recipe in the recipe database is associated with a time factor, and the method further comprises analyzing the time factor associated with the retrieved recipe.

10. In a computer for recommending recipes catered to a particular user's preference, each recipe being represented by a recipe vector having a plurality of fields, each field corresponding to a chemical component contained in food, a method for creating the recipe vector for a particular recipe comprising:

maintaining a chemical database storing a list ingredients and chemical components found in each of the ingredients;

parsing the particular recipe for ingredients contained in the particular recipe;

searching for the parsed ingredients in the chemical database;

retrieving the chemical components found in each of the parsed ingredients; and assigning values to the fields of the recipe vector corresponding to the retrieved chemical components, the values being based on a total amount of each retrieved chemical component, the recipe vector being used for comparing against a user preference vector for determining whether the particular recipe may be recommended to the user.

11. The method of claim 10, wherein each field is assigned a weight, the weight being dependent on contributions of the chemical composition corresponding to each field to the food's taste or attribute.

12. The method of claim 10, further comprising:

creating an ingredient vector for each of the parsed ingredients, the ingredient vector having a plurality of fields, the fields of the ingredient vector corresponding to the fields of the recipe vector; and assigning values to the fields of the ingredient vector, the values being based on an amount of each retrieved chemical component found in the parsed ingredient.

13. The method of claim 12, wherein the assigning values comprises assigning values based on a vector addition of all the ingredient vectors.

14. A computer system for recommending recipes catered to a particular user's preferences, the system comprising:

means for creating a user preference vector having a plurality of fields, each field corresponding to a chemical component contained in food;

means for obtaining user preference for a particular type of dish;

means for analyzing the chemical components contained in the dish;

means for assigning values to the fields of the user preference vector corresponding to the chemical components contained in the dish;

means for storing recipes for being recommended to the user; and means for comparing the recipes with the user preference vector;

means for selecting one or more recipes as a recommended recipe.

15. The system of claim 14 further comprising means for creating a recipe vector for the recipe, the recipe vector having a plurality of fields, the fields of the recipe vector corresponding to the fields of the user preference vector.

16. The system of claim 15, wherein the means for creating the recipe vector further comprises:

means for parsing the recipe for ingredients contained in the recipe;

means for searching for the ingredients in a chemical database;

means for retrieving chemical components found in each of the ingredients; and means for assigning values to the fields of the recipe vector corresponding to the retrieved chemical components.

17. The system of claim 14 further comprising:

means for obtaining user feedback about the recommended recipe; and means for modifying the value of at least one of the fields of the user preference vector based on the user feedback.

18. The system of claim 17, wherein the means for obtaining user feedback further comprises means for obtaining a user rating for the recommended recipe, and the means for modifying the value further comprises:

means for analyzing the chemical components contained in the recipe;

means for locating the fields of the user preference vector corresponding to the chemical components contained in the recipe; and means for changing the values of the retrieved fields.

19. The system of claim 14 further comprising means for assigning a weight to each field, the weight being dependent on contributions of the chemical composition corresponding to each field to the food's taste or attribute.

20. The system of claim 14 further comprising:

means for maintaining a list of products offered by a particular vendor;

means for parsing the recommend recipe for specific ingredients;

means for searching for the specific ingredients; and means for inserting matching products offered by the particular vendor into a shopping list.

21. The system of claim 14 further comprising means for analyzing a time factor associated with the retrieved recipe.

22. computer system for creating a recipe vector for recommending a recipe catered to a particular user's preferences, the recipe vector having a plurality of fields, each field corresponding to a chemical component contained in food, the system comprising:

means for storing a list of ingredients and chemical components found in each of the ingredients;

means for obtaining ingredients contained in the particular recipe;

means for searching for the obtained ingredients in the chemical database;

means for retrieving the chemical components found in each of the obtained ingredients; and means for assigning values to the fields of the recipe vector corresponding the retrieved chemical components the recipe vector being used for comparing against a user preference vector for determining whether the particular recipe may be recommended to the user.

23. The system of claim 22 further comprising means for assigning a weight to each field, the weight being dependent on contributions of the chemical composition corresponding to each field to the food's taste or attribute.

24. The system of claim 22 further comprising:

means for creating an ingredient vector for each of the obtained ingredients, the ingredient vector having a plurality of fields, the fields of the ingredient vector corresponding to the fields of the recipe vector; and means for assigning values to the fields of the ingredient vector.

25. A computer system adapted to recommend recipes catered to a particular user's preferences, the system comprising:

a processor; and a memory coupled to the processor and having program instructions stored therein, the processor being operable to execute the program instructions, the program instructions including:

creating a user preference vector having a plurality of fields, each field corresponding to a chemical component contained in food;

obtaining a user preference for a particular type of dish;

analyzing the chemical components contained in the dish;

assigning values to the fields of the user preference vector corresponding to the chemical components contained in the dish, the values being based on an amount of each chemical component present in the dish;

retrieving a recipe from a menu recommendation database;

comparing the recipe with the user preference vector; and selecting the recipe as a recommended recipe.

26. The computer system of claim 25, wherein the program instructions further include creating a recipe vector for the recipe, the recipe vector having a plurality of fields, the fields of the recipe vector corresponding to the fields of the user preference vector.

27. The computer system of claim 26, wherein the comparing includes calculating a vector distance between the user preference vector and the recipe vector.

28. The computer system of claim 26, wherein the creating the recipe vector further comprises:

parsing the recipe for ingredients contained in the recipe;

searching for the ingredients in a chemical database;

retrieving chemical components found in each of the ingredients; and assigning values to the fields of the recipe vector corresponding to the retrieved chemical components, the values being based on a total amount of each retrieved chemical component.

29. The computer system of claim 25, wherein the program instructions further include:

obtaining user feedback about the recommended recipe; and modifying the value of at least one of the fields of the user preference vector based on the user feedback.

30. The computer system of claim 29, wherein the obtaining user feedback further comprises obtaining a user rating for the recommended recipe, and the modifying the value further comprises:

analyzing the chemical components contained in the recipe;

locating the fields of the user preference vector corresponding to the chemical components contained in the recipe; and changing the values of the retrieved fields, the change of value being proportional to the rating provided by the user.

31. The computer system of claim 25, wherein each field is assigned a weight, the weight being dependent on contributions of the chemical composition corresponding to each field to the food's taste or attribute.

32. The computer system of claim 25, wherein the program instructions further include:

maintaining a list of products offered by a particular vendor in a retailer inventory database;

parsing the recommend recipe for specific ingredients;

searching the retailer inventory database for the specific ingredients; and inserting matching products offered by the particular vendor into a shopping list.

33. The computer system of claim 25, wherein each recipe in the recipe database is associated with a time factor, and the method further comprises analyzing the time factor associated with the retrieved recipe.

34. A computer system for creating a recipe vector for recommending a recipe catered to a particular user's preferences, the recipe vector having a plurality of fields, each field corresponding to a chemical component contained in food, the system comprising:

a memory storing a chemical database including a list of ingredients and chemical components found in each of the ingredients, the memory having program instructions stored therein; and a processor coupled to the memory, the processor being operable to execute the program instructions, the program instructions including:

parsing the particular recipe for ingredients contained in the particular recipe;

searching for the parsed ingredients in the chemical database;

retrieving the chemical components found in each of the parsed ingredients; and assigning values to the fields of the recipe vector corresponding to the retrieved chemical components, the values being based on a total amount of each retrieved chemical component, the recipe vector being used for comparing against a user preference vector determining whether the particular recipe may be recommended to the user.

35. The computer system of claim 34, wherein each field is assigned a weight, the weight being dependent on contributions of the chemical composition corresponding to each field to the food's taste or attribute.

36. The computer system of claim 34, wherein the program instruction further include:

creating an ingredient vector for each of the parsed ingredients, the ingredient vector having a plurality of fields, the fields of the ingredient vector corresponding to the fields of the recipe vector; and assigning values to the fields of the ingredient vector, the values being based on an amount of each retrieved chemical component found in the parsed ingredient.

37. The computer system of claim 36, wherein the assigning values comprises assigning values based on a vector addition of all the ingredient vectors.

* * * * *

UNITED STATES PATENT AND TRADEMARK OFFICE
CERTIFICATE OF CORRECTION

PATENT NO. : 6,370,513 B1
DATED : April 9, 2002
INVENTOR(S) : Adam K. Kolawa et al.

It is certified that error appears in the above-identified patent and that said Letters Patent is hereby corrected as shown below:

Column 1,
Lines 6-14, delete paragraph and heading.

Column 5,
Line 21, replace "Phillips-Mangavox" with -- Philips-Magnavox --.

Column 23,
Line 31, after "computer" insert -- system --.
Line 37, after "a list" insert -- of --.
Line 14, after "user;" delete "and".
Line 16, after "vector;" insert -- and --.

Column 25,
Line 15, after "corresponding" insert -- to --.

Column 27,
Line 1, after "vector" insert -- for --.

Signed and Sealed this

Third Day of May, 2005

JON W. DUDAS
*Director of the United States Patent and Trademark Office*